US009630523B2

(12) United States Patent
Watanabe

(10) Patent No.: US 9,630,523 B2
(45) Date of Patent: Apr. 25, 2017

(54) SEMICONDUCTOR INTEGRATED CIRCUIT DEVICE

(71) Applicant: Renesas Electronics Corporation, Tokyo (JP)

(72) Inventor: Hisaaki Watanabe, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/953,136

(22) Filed: Nov. 27, 2015

(65) Prior Publication Data

US 2016/0075255 A1   Mar. 17, 2016

Related U.S. Application Data

(63) Continuation of application No. 14/108,022, filed on Dec. 16, 2013, now Pat. No. 9,221,357, which is a
(Continued)

(30) Foreign Application Priority Data

Mar. 27, 2009 (JP) ................................. 2009-078732

(51) Int. Cl.
*G05B 1/06* (2006.01)
*B60L 15/20* (2006.01)
(Continued)

(52) U.S. Cl.
CPC ............. *B60L 15/20* (2013.01); *B60L 15/025* (2013.01); *B60L 15/2045* (2013.01);
(Continued)

(58) Field of Classification Search
USPC ....... 318/434, 461, 799, 807, 809, 701, 433, 318/268, 432, 400.21, 685, 599, 811, 661;
(Continued)

(56) References Cited

U.S. PATENT DOCUMENTS 5,818,116 A   10/1998 Nakae et al.
6,160,955 A   12/2000 Bicciato
(Continued)

FOREIGN PATENT DOCUMENTS

CN   1499508 A   5/2004
CN   1517683 A   8/2004
(Continued)

OTHER PUBLICATIONS

Office Action issued May 7, 2013, in related Japanese Application No. 2011-505922.
(Continued)

*Primary Examiner* — Jorge L Carrasquillo
(74) *Attorney, Agent, or Firm* — Shapiro, Gabor and Rosenberger, PLLC

(57) ABSTRACT

A motor speed determining circuit determining a rotation speed of a motor is provided and a processing of generating motor driving waveform is switched in accordance with the rotation speed of the motor. A resolver signal outputted from a resolver 2 is converted to a digital value by an R/D converter 3, and inputted to a computing circuit of resolver value correction 5 via an R/D conversion interface 4. A current value of a motor M is converted to a digital value by an A/D convertor 8. The computing circuit of resolver value correction 5 computes a resolver correction value of the inputted digital signal and calculates positional data from a corrected resolver value. The computing circuit of motor control computes a current instruction value from a motor current value subjected to digital conversion by the A/D converter 8 and a motor current instruction value etc., and a motor waveform output circuit 7 generates a motor driving waveform from the current instruction value and outputs the same to a power module PM.

24 Claims, 17 Drawing Sheets

Related U.S. Application Data continuation of application No. 13/258,544, filed as application No. PCT/JP2010/051916 on Feb. 10, 2010, now Pat. No. 8,633,667.

(51) Int. Cl.
  *H02P 23/00* (2016.01)
  *H02P 27/04* (2016.01)
  *B60L 15/02* (2006.01)
  *B60W 10/00* (2006.01)

(52) U.S. Cl.
  CPC ......... *B60W 10/00* (2013.01); *H02P 23/0027* (2013.01); *H02P 27/04* (2013.01); *B60L 2240/421* (2013.01); *B60L 2240/429* (2013.01); *Y02T 10/643* (2013.01); *Y02T 10/72* (2013.01); *Y02T 10/7258* (2013.01); *Y02T 10/7283* (2013.01); *Y10S 903/903* (2013.01)

(58) Field of Classification Search
  USPC ..... 369/47.39, 53.3, 266, 267; 701/41, 32.7, 701/22, 33.8; 700/19, 2, 20, 23, 39, 40, 700/78; 324/160, 166; 360/73.03; 375/150, 142, 224
  See application file for complete search history.

(56) References Cited

U.S. PATENT DOCUMENTS

| | | | |
|---|---|---|---|
| 2001/0027537 A1* | 10/2001 | Nada | B60K 6/365 |
| | | | 714/23 |
| 2004/0085668 A1* | 5/2004 | Sakamoto | G11B 19/20 |
| | | | 360/73.03 |
| 2004/0150359 A1* | 8/2004 | Yaguchi | H02P 5/56 |
| | | | 318/400.02 |
| 2006/0250104 A1* | 11/2006 | Reichert | G02B 26/122 |
| | | | 318/651 |
| 2008/0309527 A1 | 12/2008 | Inoue | |
| 2009/0140682 A1 | 6/2009 | Watahiki | |
| 2009/0159350 A1 | 6/2009 | Hanada et al. | |
| 2012/0019179 A1* | 1/2012 | Yamada | G01D 5/24485 |
| | | | 318/400.04 |

FOREIGN PATENT DOCUMENTS

| | | |
|---|---|---|
| JP | H-0450452 A | 2/1992 |
| JP | 2004-152441 A | 5/2004 |
| JP | 2004-222448 A | 8/2004 |
| JP | 2006-262582 A | 9/2006 |
| JP | 2006262582 A * | 9/2006 |
| JP | 2007-020383 A | 1/2007 |
| JP | 2007-033412 A | 2/2007 |
| JP | 2007-108861 A | 4/2007 |
| JP | 2007-267449 A | 10/2007 |
| JP | 2008-256486 A | 10/2008 |

OTHER PUBLICATIONS

Office Action issued Sep. 17, 2013, in related Japanese Patent Application No. 2011-505922.

Office Action issued Dec. 15, 2015, in Chinese Application No. 2014102649223.

* cited by examiner

SEMICONDUCTOR INTEGRATED CIRCUIT DEVICE

TECHNICAL FIELD

The present invention relates to a semiconductor integrated circuit device, more particularly, control technology that is effective for motors. This technology can be suitably used in controllers for motor control used in electric vehicles and hybrid vehicles.

BACKGROUND ART

Electric vehicles or hybrid vehicles are provided with drive motors. As technology of detecting a rotation angle of a rotator (output shaft) of a drive motor, technology using a resolver has been known.

Position detection by this kind of resolver is carried out by converting an output of a resolver to a rotation angle by an R/D (Resolver/Digital) converter, and a motor control device controls a drive current amount for controlling rotation of a drive motor in accordance with the rotation angle (for example, see Patent Document 1).

FIG. 8 of Patent Document 1 describes that a rotation angle of a motor is detected by a resolver, rotation angle information is converted by an R/D processing portion, then an output value of the resolver is corrected by a correcting portion, and a CPU controls a motor driver; and also describes that a correction value for correcting an output value of the resolver is stored in a PROM.

RELATED ART DOCUMENT

Patent Document

Patent Document 1: Japanese Patent Application Laid-Open Publication No. 2008-256486

DISCLOSURE OF THE INVENTION

Problems to be Solved by the Invention

However, the inventor of the invention found the following problems in the position detection technology of a drive motor by a resolver described above.

According to a consideration by the inventor of the present invention, he recognized that there are following problems, which are not described in Patent Document 1.

In current engine-driven vehicles, engine speed is decelerated by a gear not to make the engine speed too high in consideration of fuel combustion efficiency; however, by enabling high revolution driving by a motor, it is possible to relatively reduce deceleration of rotation speed relying on the gear. Regarding practical motor speed in, particularly, electric vehicles as well as hybrid vehicles, controlling the rotation speed from 0 rpm in a halting state to a high speed like over 1000 rpm is preferable, and thus implementing high revolution is anticipated. In accordance with the motor speed, it is necessary for a motor control device to control current to be supplied to a stator coil/rotator coil of the motor.

Operation of a motor control device having the configuration described in Patent Document 1 is supposed to be as follows: the CPU receives an interruption notification and executes program for driving the motor driver in accordance with the correction value at the correcting portion upon every conversion of an output of the resolver to a digital value indicating a rotation angle at the R/D processing.

When performing drive control of the motor driver by correcting at every 5 degrees of rotation angle, a frequency of occurrence of interruption notification in motor driving at 1000 rpm is 12 kHz (1000 rpm (about 166 rps)×360/5).

There are 1000 steps of processing steps per one interruption notification, and when assuming that a ratio of the interruption processing operation occupying the operation processing of the CPU is 25%, 48 MHz (12K×4000 steps) is required as an operation frequency (assuming 1 step/1 clock cycle) of the CPU. Meanwhile, it is 36 MHz in a halting state.

When the CPU is regularly operated at 48 MHz in accordance with 10000 rpm, waste power consumption of about 33% occurs.

Also, to improve energy efficiency of the motor by controlling the motor at a precision higher than that of the motor, it is necessary to perform control of the current to be supplied to the motor at a finer rotation angle, resulting in a further higher operation frequency upon high-speed rotation, and enlarging diremption of the operation frequency that is necessary in motor control in a halting state and a high-speed rotation state.

Further, when controlling the drive motor at a high-speed rotation, time margin on correction computing by software is lost, posing a fear of performing control at a timing with error, and thus there is a problem of a large lowering in driving efficiency of the drive motor.

A preferred aim of the present invention is to provide a semiconductor integrated circuit device for motor control suppressing operation frequency of a CPU.

Another preferred aim of the present invention is to provide a semiconductor integrated circuit device for motor control capable of reducing power consumption.

Moreover, still another preferred aim of the present invention is to provide a semiconductor integrated circuit device for motor driver capable of smoothly and efficiently controlling driving of a motor from a halting state to a high-speed rotation of the motor.

The above and other preferred aims and novel characteristics of the present invention will be apparent from the description of the present specification and the accompanying drawings.

Means for Solving the Problems

A semiconductor integrated circuit device according to the present invention determines a motor speed and changes operations in accordance with the motor speed.

For example, the semiconductor integrated circuit device determines a rotation speed of a motor, controls driving of a motor by software processings by a CPU when the motor speed is smaller than a predetermined rotation speed, and controls driving of a motor by a hardware circuit when the rotation speed of the motor is larger than the predetermined rotation speed.

Further, the semiconductor integrated circuit device determines a motor speed, and controls so that driving waveforms of the motor is changed depending on whether the motor speed is smaller than or larger than a predetermined rotation speed.

Effects of the Invention

The effects obtained by typical aspects of the present invention will be briefly described below.

(1) As a motor speed can be detected at a high speed and high accuracy, it is possible to more smoothly and more efficiently driving a motor particularly in controlling high-speed driving.

(2) By switching control depending on a motor speed, it is possible to select an optimum control method in accordance with processing load.

(3) As an operation speed of a CPU can be suppressed, a reduction in power consumption of a semiconductor integrated circuit device can be achieved.

BRIEF DESCRIPTIONS OF THE DRAWINGS

BEST MODE FOR CARRYING OUT THE INVENTION

Figure 1:
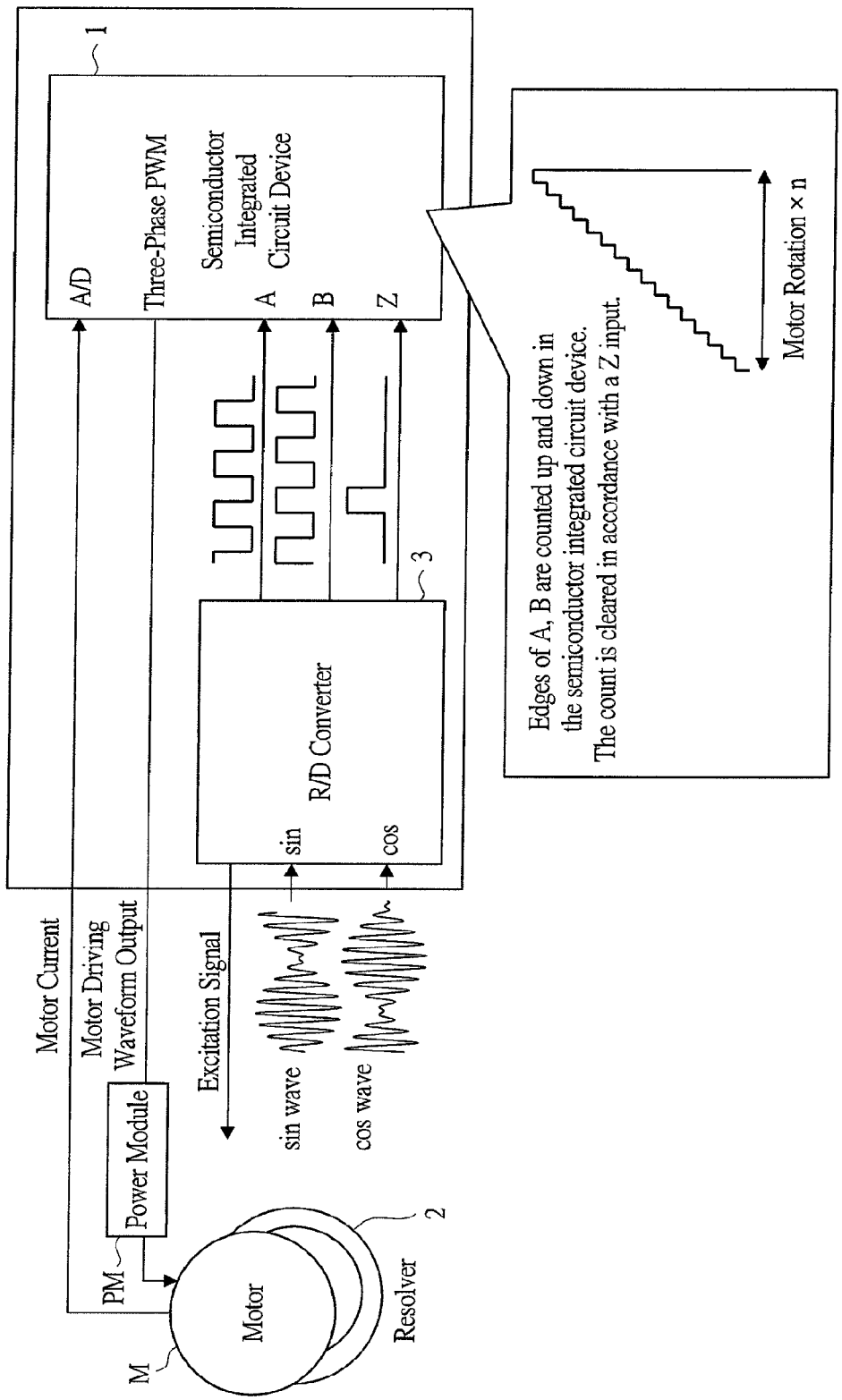
FIG. 1 is a block diagram illustrating a configuration example of a motor driving system used in electric vehicles and hybrid vehicles according to a first embodiment of the present invention.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

A semiconductor integrated circuit device (1) according to the embodiment includes a motor speed determining circuit (9) which determines whether a motor is rotating at amid to high revolution or being halted to at a low revolution; and controls switching so that motor driving control is performed by a software processing by a CPU (10) when the motor is halted to at a low revolution, and so that motor driving control by a hardware circuit (5, 6) is performed when the motor is at a mid to high revolution.

In addition, the semiconductor integrated circuit device (1) includes, as a hardware circuit performing motor driving control, a computing portion of resolver value correction (5, 12) that sequentially corrects a resolver value, which includes error made by counting up a resolver signal converted to a digital signal and outputted from a resolver attached to a motor, by a hardware processing.

Further, in the semiconductor integrated circuit device (1) according to the embodiment, the computing portion of resolver value correction (5, 12) includes: a data storage portion (12) which stores first error correction data of a difference between a resolver value including error for one cycle of the resolver and a reference resolver value not including error; and a computing circuit of resolver value correction (5) which performs a correcting processing of the resolver value including error based on the first error correction data, the computing circuit of resolver value correction (5) performing processings of: adding/subtracting the first error correction data to/from the resolver value including error inputted; calculating a shift between the resolver value not including error and the resolver value including error per optional cycle obtained by dividing one cycle of the resolver by two or more; comparing a ratio of the second error correction data and the first error correction data; and reflecting the ratio as third error correction data to a next resolver value.

Still further, the semiconductor integrated circuit device (1) according to the embodiment is formed in a hardware configuration in which the computing circuit of resolver value correction performs a data flow operation.

Moreover, the semiconductor integrated circuit device (1) according to the embodiment includes, as another hardware circuit performing motor driving control, a motor control portion (6, 7) which generates a motor driving waveform generating a drive control signal for driving the motor, and the motor control portion (6, 7) calculates positional data of the motor from the resolver value corrected by the computing portion of resolver value correction (5, 12), computes a current instruction value from the positional data, a value of motor current flowing in the motor, and a motor current instruction value, and generates a motor driving waveform from the current instruction value.

A motor driving system according to the embodiment includes: a motor (M); a resolver (2); a power module (PM); and a semiconductor integrated circuit device (1). The semiconductor integrated circuit device (1) includes: an R/D converter (3); an R/D converting interface (4); a motor waveform output circuit (7); and an A/D converter (8). The resolver (2) is connected to the R/D converter (3), and an output of the R/D converter (3) is connected to the R/D converting interface (4). Current of the motor (M) is inputted to the A/D converter (8) A motor drive waveform is outputted from the motor waveform output circuit (7) so that the motor (M) is driven via the power module (PM).

First Embodiment

FIG. 1 is a block diagram illustrating a configuration example of a motor driving system used in electric vehicles and hybrid vehicles (hereinafter, called electric vehicles etc).

In the present embodiment, a semiconductor integrated circuit device 1 is, as illustrated in FIG. 1, a microcomputer (also called microcontroller) which controls, for example, a three-phase motor M used in, for example, electric vehicles. The motor M has a resolver 2 embedded therein which detects a rotation angle of the motor M.

An R/D converter 3 is connected to a resolver 2, and the semiconductor integrated circuit device 1 is connected to the R/D converter 3. Note that, although the R/D converter 3 is provided outside the semiconductor integrated circuit device 1 in the configuration herein, the R/D converter 3 may be provided inside the semiconductor integrated circuit device 1. When the R/D converter 3 is provided inside the semiconductor integrated circuit device 1, the number of parts of the motor driving system is reduced and thus the system can be down-sized, and also a cost can be low.

The resolver 2 generates a sine (sin) wave and a cosine (cos) wave based on an excitation signal outputted from the R/D converter 3. The R/D converter 3 converts the sin wave and cos wave of analog signals generated by the resolver 2 to digital signals and outputs the same to the semiconductor integrated circuit device 1.

From the R/D converter 3, a digital signal A and a digital signal B made by converting the sin wave and cos wave of analog signals to digital signals, and a Z phase signal Z, where one Z phase signal Z is generated per one cycle of the motor M, are outputted.

The semiconductor integrated circuit device 1 counts up the digital signals A and B converted by the R/D converter 3, detects a rotation angle of the motor M (e.g., 0° to 360°), generates a motor driving waveform from a current instruction value generated in accordance with the rotation angle of the motor M, and outputs the driving waveform to a power module PM. Also, when the Z phase signal Z is inputted, the counting up is cleared.

Figure 2:
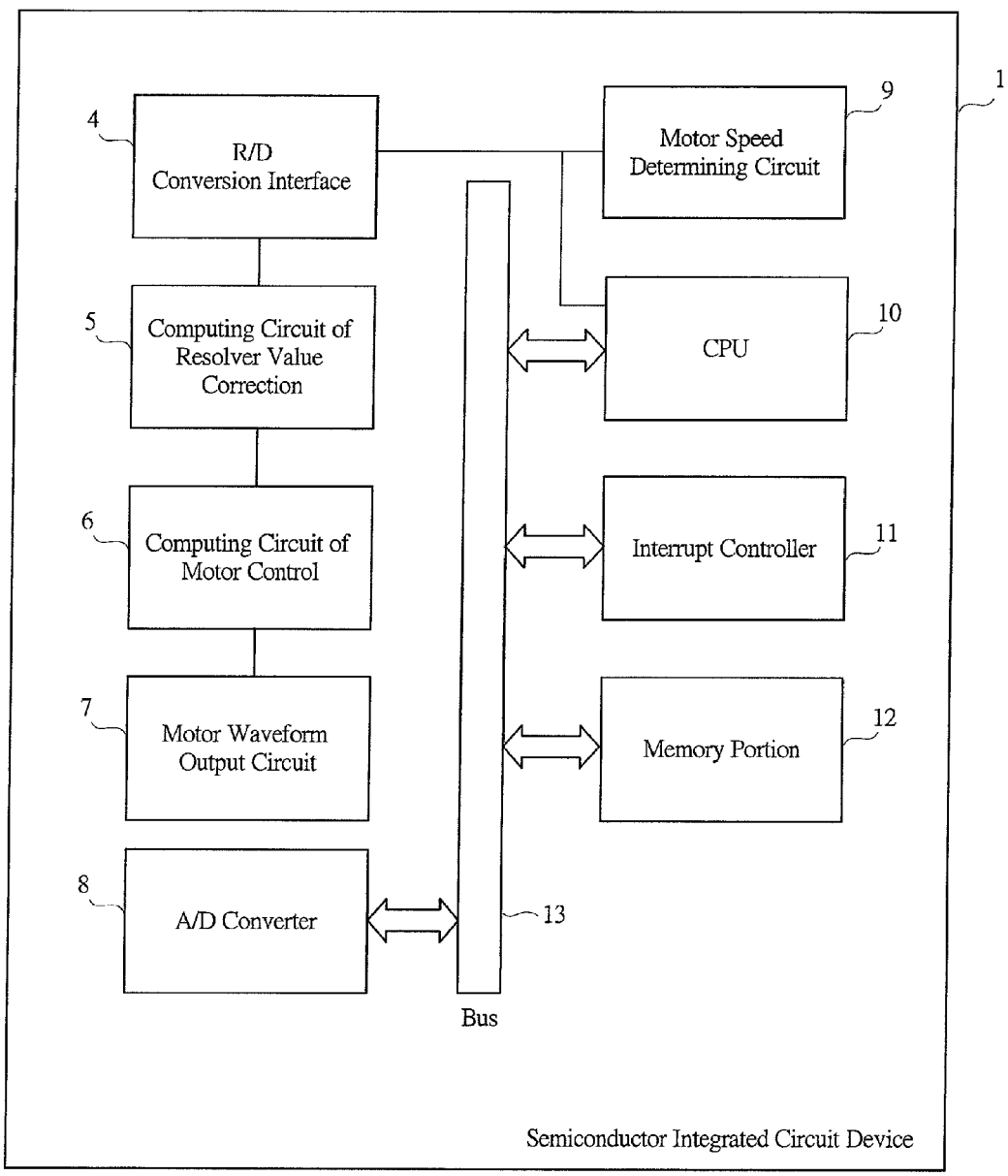
FIG. 2 is a block diagram illustrating a configuration example of a semiconductor integrated circuit device used in the motor driving system in FIG. 1.

FIG. 2 is a block diagram illustrating a configuration example of the semiconductor integrated circuit device 1.

The semiconductor integrated circuit device 1 is formed of: an R/D conversion interface 4; a computing circuit of resolver value correction 5; a computing circuit of motor control circuit 6 to be a motor controlling portion; a motor waveform output circuit 7 to be also a motor controlling portion; an A/D (analog/digital) converter 8; a motor speed determining circuit 9; a CPU (Central Processing Unit) 10; an interruption controller 11; and a memory portion 12 to be a data storage portion. In addition, a computing portion of resolver value correction is formed of the computing circuit of resolver value correction 5 and the memory portion 12.

Further, the A/D converter 8, the motor speed determining circuit 9, the CPU 10, the interruption controller 11, and the memory 12 are mutually connected via a bus 13, and the computing circuit of resolver value correction is connected to the memory portion 12 via the bus 13 or a dedicated bus for reading correction information stored in the memory portion 12.

The R/D conversion interface 4 is an interface to the R/D converter 3, and counts up the digital signals A and B converted by the R/D converter 3. The computing circuit of resolver value correction 5 corrects error of a resolver value having been counted up (hereinafter, simply called resolver value), and calculates positional data of the motor M. The motor control computing circuit 6 computes a current instruction value from the positional data calculated by the computing circuit of resolver value correction 5, a motor current value, and a motor current instruction value, etc.

The motor waveform output circuit 7 outputs a driving waveform of the motor M based on the current instruction value computed by the motor control computing circuit 6. The A/D converter 8 converts the current value that is an analog signal in the motor M to a motor current value of a digital signal.

The motor speed determining circuit 9 determines a rotation speed of the motor M, determines that the motor M is in a halting state, at a low speed, a mid speed, or a high speed; and, based on a result of the determination, the motor speed determining circuit 9 switches motor driving control which will be described below.

The CPU 10 assumes all operation of the semiconductor integrated circuit device 1. The interrupt controller 11 controls a interrupt processing from the CPU 10 etc. The memory portion 12 is formed of, for example, RAM (Random Access Memory)/ROM (Read Only Memory), and stores program for motor driving control and data calculated by the computing circuit of resolver value correction 5 etc. The RAM is formed of a volatile memory such as an SRAM or the like and the ROM is formed of a non-volatile memory such as a mask ROM, a flash memory or the like. A flash memory for data and a flash memory for program may be separately configured, and a flash memory shared for both data and program may be used. Also, functions of both RAM and ROM may be configured by, for example, a MRAM (Magnetoresistive Random Access Memory), a phase-change memory, or a ferroelectric memory.

Figure 3:
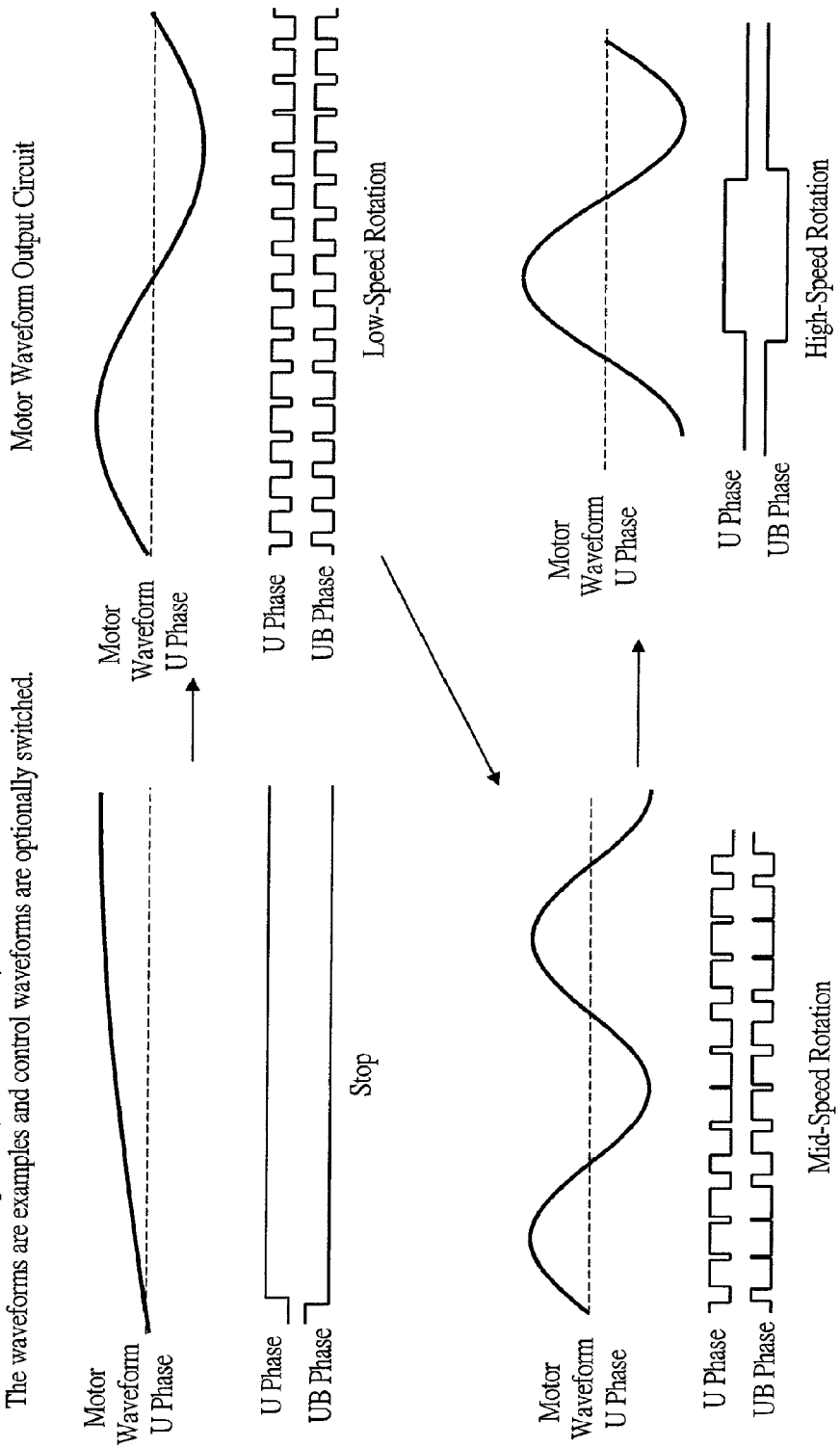
FIG. 3 is an explanatory diagram illustrating an example of a driving waveform output of the motor in FIG. 1.

FIG. 3 is an explanatory diagram illustrating an example of a driving waveform output of the motor M. Note that, in FIG. 3, only U phase and UB phase (UB phase is a waveform signal of a reverse phase of U phase) are exemplified, and the other phases of V phase, VB phase, W phase, and WB phase are omitted.

The semiconductor integrated circuit device 1 performs, as illustrated, control of driving of the motor M by changing frequency and ON duty of a PWM (Pulse Width Modulation) waveform to be output as a motor driving waveform in accordance with the motor speed. The sin waveform illustrated above the U phase/UB phase is a waveform expressing a rotation state of the motor M. In addition, the driving control may be in a manner that the motor driving waveform is switched in accordance with the motor speed as described in Japanese Patent Application Laid-Open Publication No. 2007-20383.

The motor waveform output circuit 7 is configured to be capable of switching the motor driving waveform outputted by the motor waveform output circuit 7 according to an instruction (setting to a register) or the motor speed determining circuit 9.

Next, the motor driving control of the semiconductor integrated circuit device 1 according to the present embodiment will be described with reference to an explanatory diagram of operation of motor control in FIG. 4.

First, the resolver signal (sin wave, cos wave) outputted from the resolver 2 is converted to a digital value by the R/D converter 3 (step S101). Also, the semiconductor integrated circuit device 1 converts a current value of the motor M to a digital value by the A/D converter 8 (step S102).

Subsequently, an R/D conversion interface 102 receives the digital signal converted by the R/D converter 3 (step S103), and outputs the same to the computing circuit of resolver value correction 5 and the motor speed determining circuit 9 (processing path illustrated by the dashed-dotted line in FIG. 4). The motor speed determining circuit 9 determines a rotation speed of the motor from frequency of the signal converted to a digital value by the R/D converter 3.

When the motor speed determining circuit 9 determines that the rotation speed of the motor M is in a halting state to at a low speed (smaller than a predetermined rotation speed), the processings of steps S104 to S106 described below are performed by software processings (an instruction signal between the motor speed determining circuit and the CPU illustrated by the thin solid line in FIG. 4). In the rotation range of the motor M, the rotation resistance of the motor is relatively high, and, due to frictional force between tires and roadway surface, it is necessary to conduct a transitional processing such as increasing a rotation torque of the motor M by increasing a current amount as well as lowering a frequency of the motor driving waveform to be supplied to the motor M, and so forth. Since the transitional processing has many individual differences and differences depending on peripheral environment, it is possible to adjust to characteristics per individual piece and/or peripheral environment by a software processing.

When the motor speed determining circuit 9 determines that the rotation speed of the motor M is at a mid speed to a high speed (larger than a predetermined rotation speed), the processings in S104 to S107 described below are hardware processings in respective circuits (the interaction signal between the motor speed determining circuit and the computing circuit of resolver value correction illustrated by the thin solid line in FIG. 4). In the rotation range, the rotation resistance of the motor and the frictional resistance to the road surface are relatively small, and thus a processing to adjust to differences in individuals and peripheral environment is unnecessary, and it is necessary to supply a motor driving waveform to the motor at an appropriated timing in accordance with a rotation angle of the motor; therefore, it is more preferable to employ hardware processings.

Alternatively, when it is possible to determine a possibility of collision from information of a deceleration braking, information of a radar and/or pressing of a brake not particularly illustrated, regardless of the motor speed determination by the motor speed determining circuit 9, at an appropriate timing in accordance with the rotation speed of the motor, the hardware processings in respective circuits in the steps S104 to S107 are performed so that a motor driving waveform, which generates a rotation torque in a reverse direction to the rotation of the tires or the rotator of the motor, is supplied to the motor.

Note that, when the motor speed is at a predetermined rotation speed, any of the software processings and the hardware processings can be performed (either of them is performed).

Regarding a boundary of determination between "halting state to low speed" and "mid speed to high speed" of the motor speed, a determination boundary value may be memorized in a non-volatile memory such as a flash memory of the memory portion 12 and the determination boundary value may be set in a register R1 of the motor speed determining circuit 9 by the CPU 10 in an initialization operation of the semiconductor integrated circuit device 1, and so forth. Also, the determination boundary does not limit a coincidence of the boundaries among low-speed rotation, mid-speed rotation, and high-speed rotation.

In the following, processings of the steps S104 to S107 will be described as operations of respective circuits when determining that the rotation speed of the motor is at a mid speed to a high speed (larger than a predetermined rotation speed).

The computing circuit of resolver value correction 5 computes a resolver correction value of the digital signal inputted from the R/D interface 4 or reads the resolver correction value from the memory portion 12 via the bus 13 (step S104), and calculates a positional data indicating a rotation angle of the motor by adding or subtracting the correction value (step S105).

Then, the computing circuit of motor control 6 computes a current instruction value from information indicating that braking is from which one of acceleration or deceleration from an axel or a brake not illustrated, positional data calculated by the computing circuit of resolver value correction 5, a motor current value digitalized by conversion by the A/D converter 8, a motor current instruction value, etc. (step S106) and outputs the current instruction value to the motor waveform output circuit 7.

The motor waveform output circuit 7 generates a motor driving waveform from the inputted current instruction value and outputs the same to the power module PM which drives the motor M (step S107).

Figure 4:
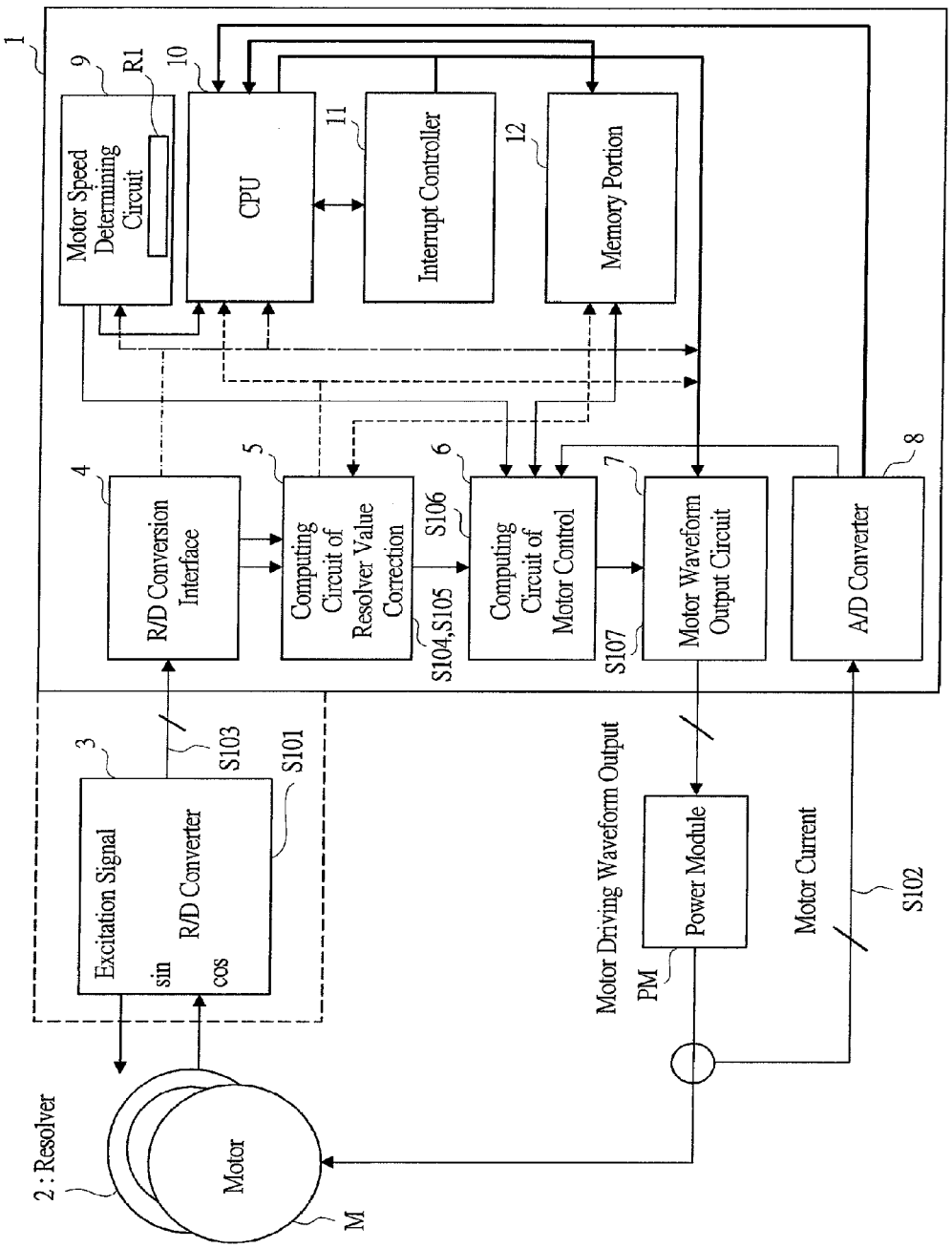
FIG. 4 is an explanatory diagram of an operation of motor control by the semiconductor integrated circuit device in FIG. 2.

Note that, in FIG. 4, the dotted lines illustrate processing paths of the steps S104 and S105, the thin solid lines illustrate processing paths of the steps S106 and S107, the dashed-dotted lines illustrate paths of the motor rotation signal, and the bold solid lines illustrate paths in the software processings.

Also, upon performing motor driving control by software processings of the CPU when the rotation speed of the motor is determined to be at a mid speed to a high speed, the correction computing processing of the resolver value by the computing circuit of resolver value correction 5 may be also performed. In this case, instead of the computing of correcting resolver value by the CPU, the control is performed so that the resolver correction value in the computing circuit of resolver value correction 5 is outputted to the CPU via the bus 13.

Figure 5:
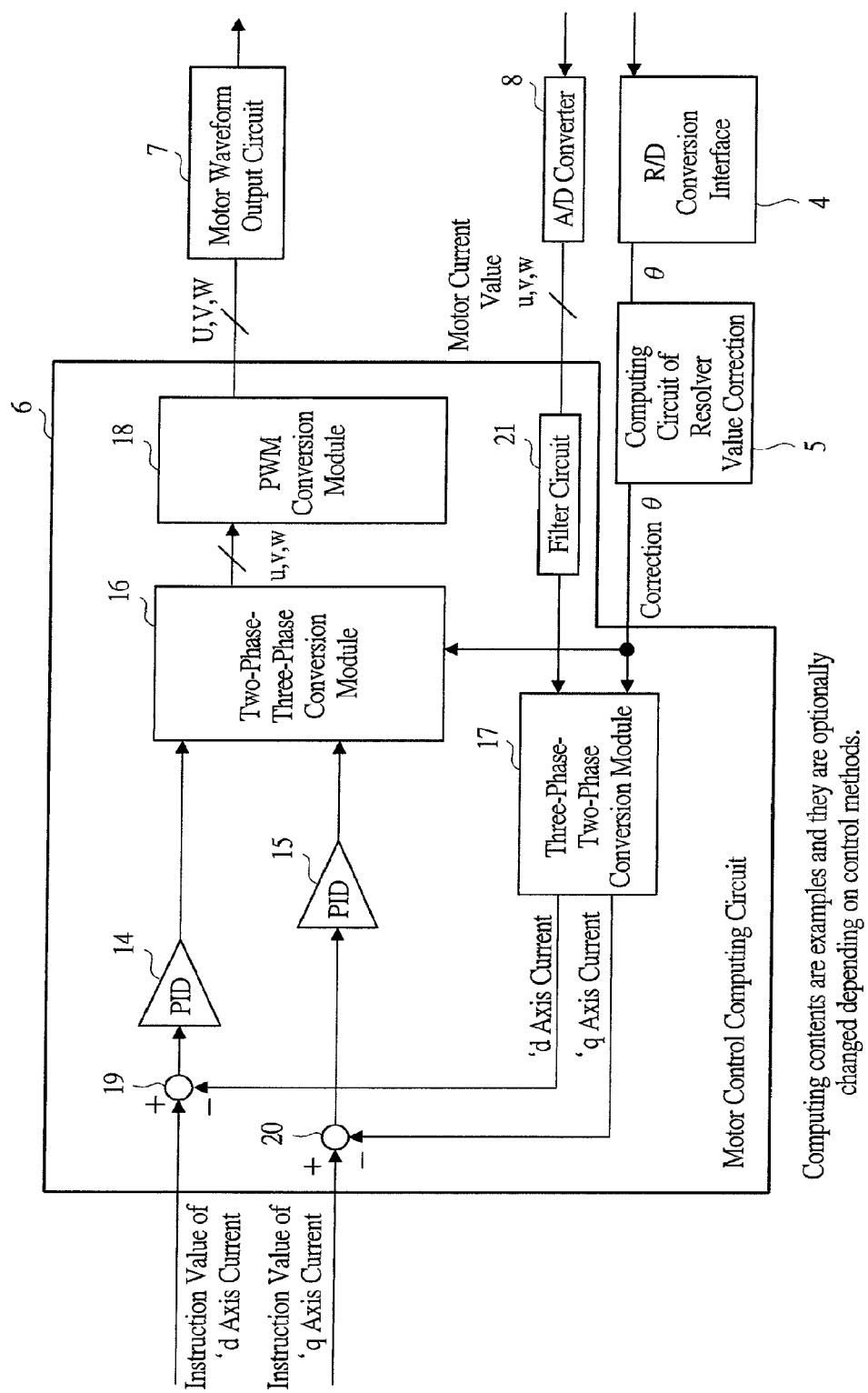
FIG. 5 is an explanatory diagram illustrating a configuration example of a motor control computing circuit provided in the semiconductor integrated circuit device in FIG. 2.

FIG. 5 is an explanatory diagram illustrating a configuration example of the computing circuit of motor control 6.

The computing circuit of motor control 6 is formed of, as illustrated, PID control modules 14 and 15, a two-phase/three-phase conversion module 16, a three-phase/two-phase conversion module 17, a PWM conversion module 18, and adders/subtractors 19 and 20.

The computing circuit of motor control 6 computes by three-phase/two-phase conversion, PID (Proportional Integral Differential) control performed by the PID (14, 15), and filter control performed by a filter circuit 21, a two-phase/ three-phase conversion, etc. according to information indicating either of braking of acceleration/deceleration, positional data (correction θ) indicating a rotation angle of the motor calculated by the computing circuit of resolver value correction 5, a motor current value (u, v, w) outputted from the A/D converter 8, a motor current instruction value ('d axis current instruction value, 'q axis current instruction value), etc.; and the computing circuit of motor control 6 subjects a computation result of each of u/v/w generated in the conversion to a conversion of frequency/duty for motor control to a reference PWM waveform in the PWM conversion module 18, and outputs the same to the motor waveform output circuit 7 as a current instruction value of each of u/v/w. The current instruction value generates a motor driving waveform which generates a rotation torque in a normal direction to the rotation of the motor in an acceleration braking of an automobile, and the current instruction value generates a motor driving waveform which generates a rotation torque in a reverse direction to the rotation of the motor in a deceleration braking.

And, the motor waveform output circuit 7 outputs the motor driving waveform illustrated in FIG. 3 to the power module PM according to the current instruction value computed by the computing circuit of motor control 6.

Next, technique of correcting error with respect to the resolver value will be described.

Figure 6:
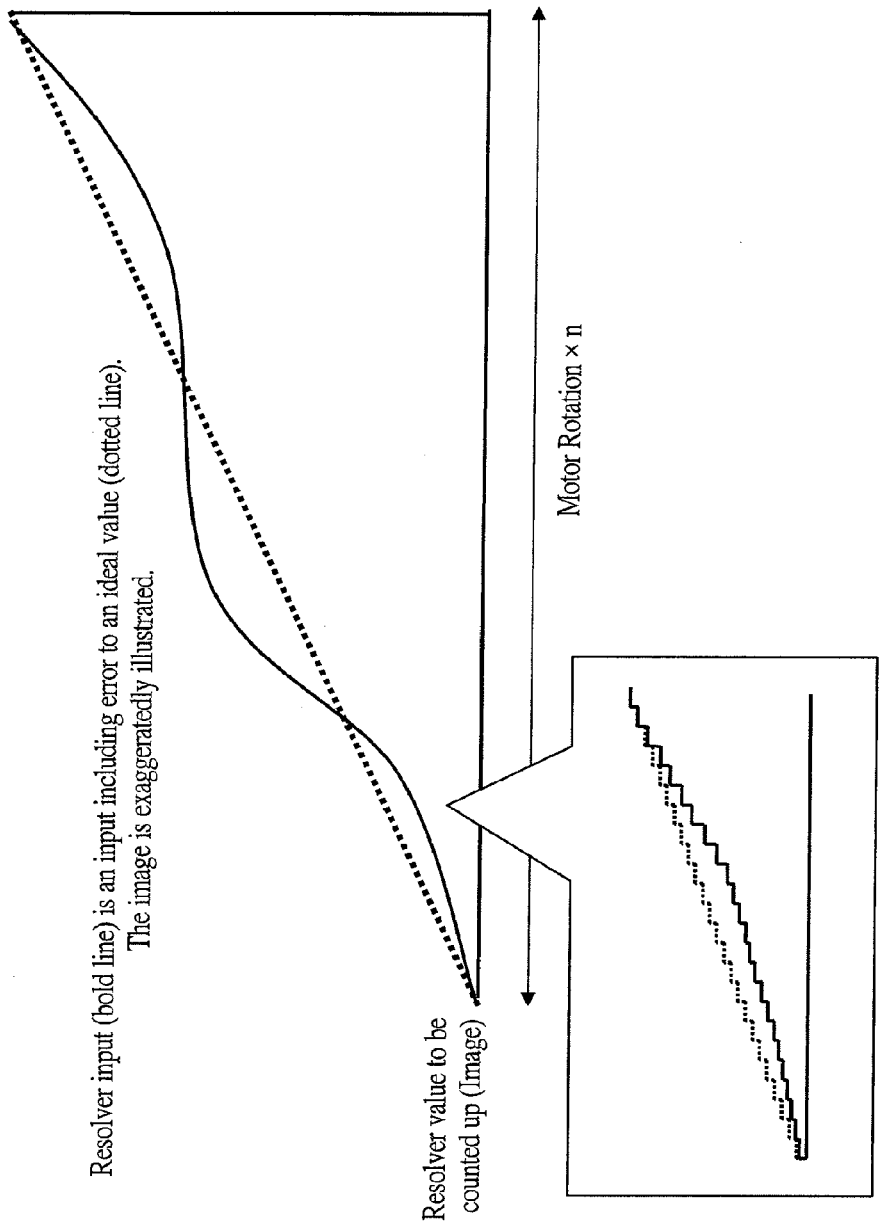
FIG. 6 is an image diagram of a resolver value including error and an ideal resolver value.

FIG. 6 is an image diagram illustrating an ideal resolver value and a resolver value including error in an exaggerated manner for facilitating understanding.

Generally, the resolver value by the resolver 2 is a value including error to an ideal value illustrated by the dotted line in FIG. 6 without exception as illustrated by the solid line in FIG. 6 due to mechanical error in, for example, the shape, size, variations of the resolver, electric variations of winding, wiring, floating capacitance, etc., and variations upon attachment such as decentering and shifts of zero point and so forth. Note that, as the resolver value is a digital value, the resolver value is in a step-like manner like the enlarged diagram as illustrated at the lower left in FIG. 6.

Figure 7:
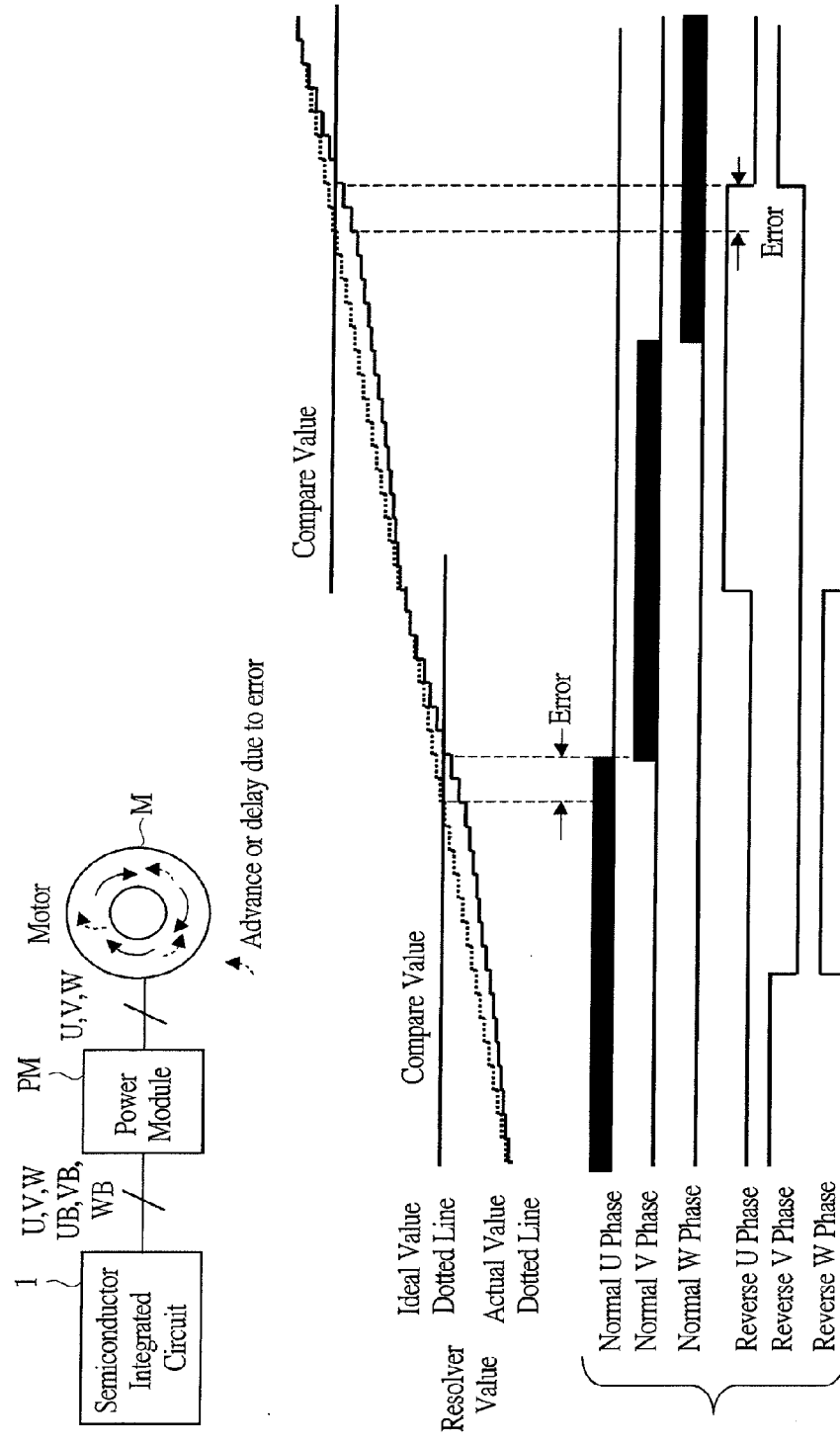
FIG. 7 is an explanatory diagram illustrating an example of energization switching timing of a motor at a high revolution according to a compare match with a resolver value including error.

FIG. 7 is an explanatory diagram illustrating an example of timing of energization switching (for example, 120°) in a high revolution of the motor according to a compare match with a resolver value including error.

Here, the normal U phase (U), normal V phase (V), normal W phase (W), reverse U phase (UB), reverse V phase (VB), and reverse W phase (WB) are output signals from the semiconductor integrated circuit device 1. These output signals control the U phase, V phase, and W phase of the motor M via the power module PM.

In this situation, when the resolver value reaches a compare value that is previously set, energizing phases of the motor are switched, and thus switching timings of the motor are different in a resolver value including error (illustrated by the solid line in FIG. 7) and an ideal resolver value not including error (illustrated by the dotted line) even at the same compare value as illustrated, resulting in error; therefore, advance and/or delay of energization switching occurs, and thus a magnetic field generated by currents flowed in coils of respective phases of U, V, W disarrange the rotation of the rotator of the motor, resulting in a lowering in rotation efficiency as the motor does not smoothly operates.

Figure 8:
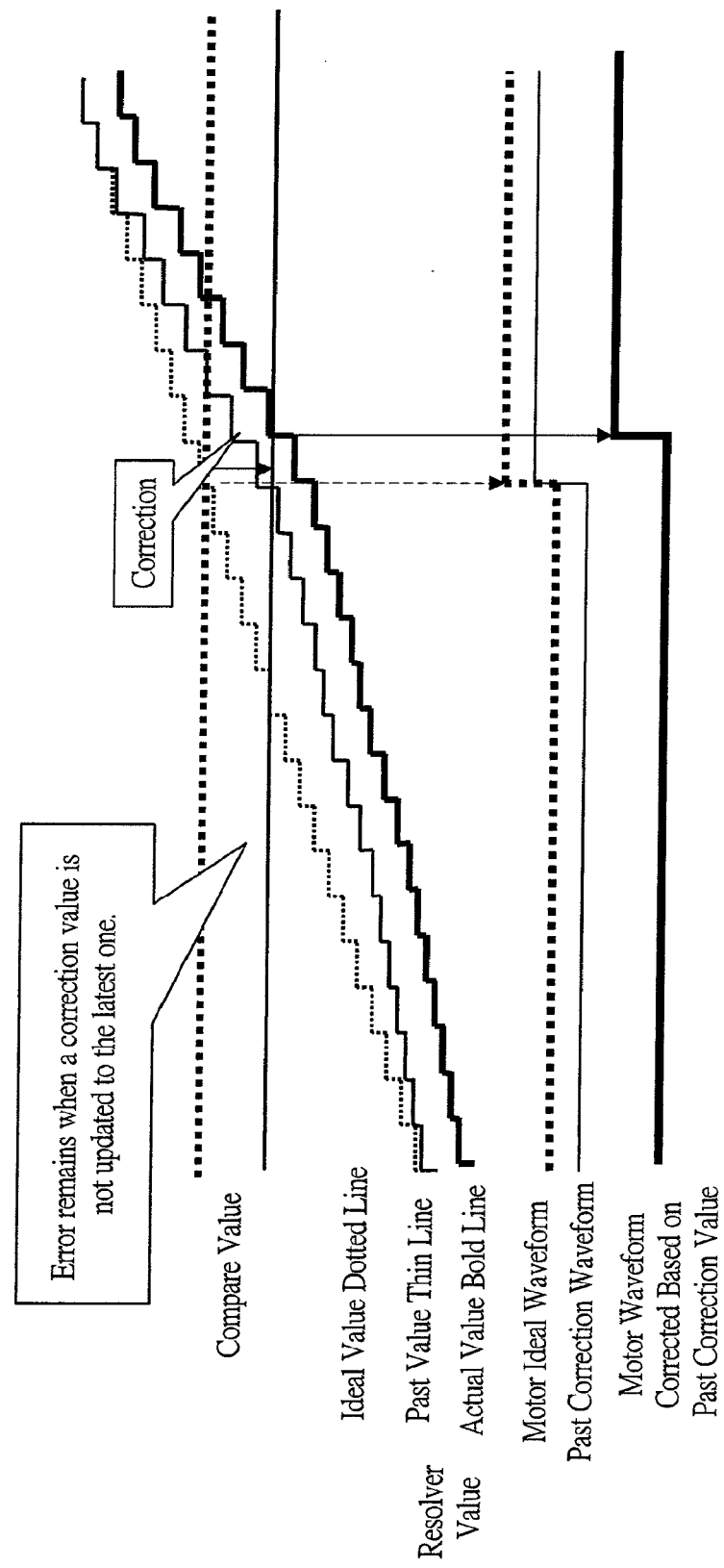
FIG. 8 is an explanatory diagram illustrating an example of energization switching timing of a motor at a high revolution according to a compare match when a resolver value including error is corrected by software.

Further, FIG. 8 is an explanatory diagram illustrating a portion for switching energization in FIG. 7 in an enlarged manner.

To switch energization of the motor drive current at an appropriate timing with respect to the resolver value including error (the step-like waveform illustrated by the thin solid line), it is necessary to correct the compare value (compare value illustrated by the thin solid line). Meanwhile, to switch energization of the motor drive current at an appropriate timing with respect to the ideal resolver value not including error (the step-like waveform illustrated by the thin dotted line) after correcting the resolver value by correction data, it is unnecessary to correct the compare value (compare value illustrated by the bold dotted line).

In the correction technique by software in correction of resolver value, performing correction computing by software from, for example, correction data (data of past cycles at a low-speed revolution, etc.) with respect to the resolver value can be considered. In this case, update frequency of correction computing and computing processing time of software are problematic. If the computing processing time is long and the update frequency of correction computing is low, sufficient correction cannot be performed and error remains (the step-like waveform illustrated by the thin solid line). The ratio of error is relatively small in a low-speed revolution of the motor, but the ratio of error is relatively large in a high-speed revolution of the motor, and thus energization switching control including computing error is made. Note that the motor ideal waveform and the motor waveform including error in FIG. 8 are output signals from the semiconductor integrated circuit device 1 such as the normal U phase (U) in FIG. 7.

Figure 9:
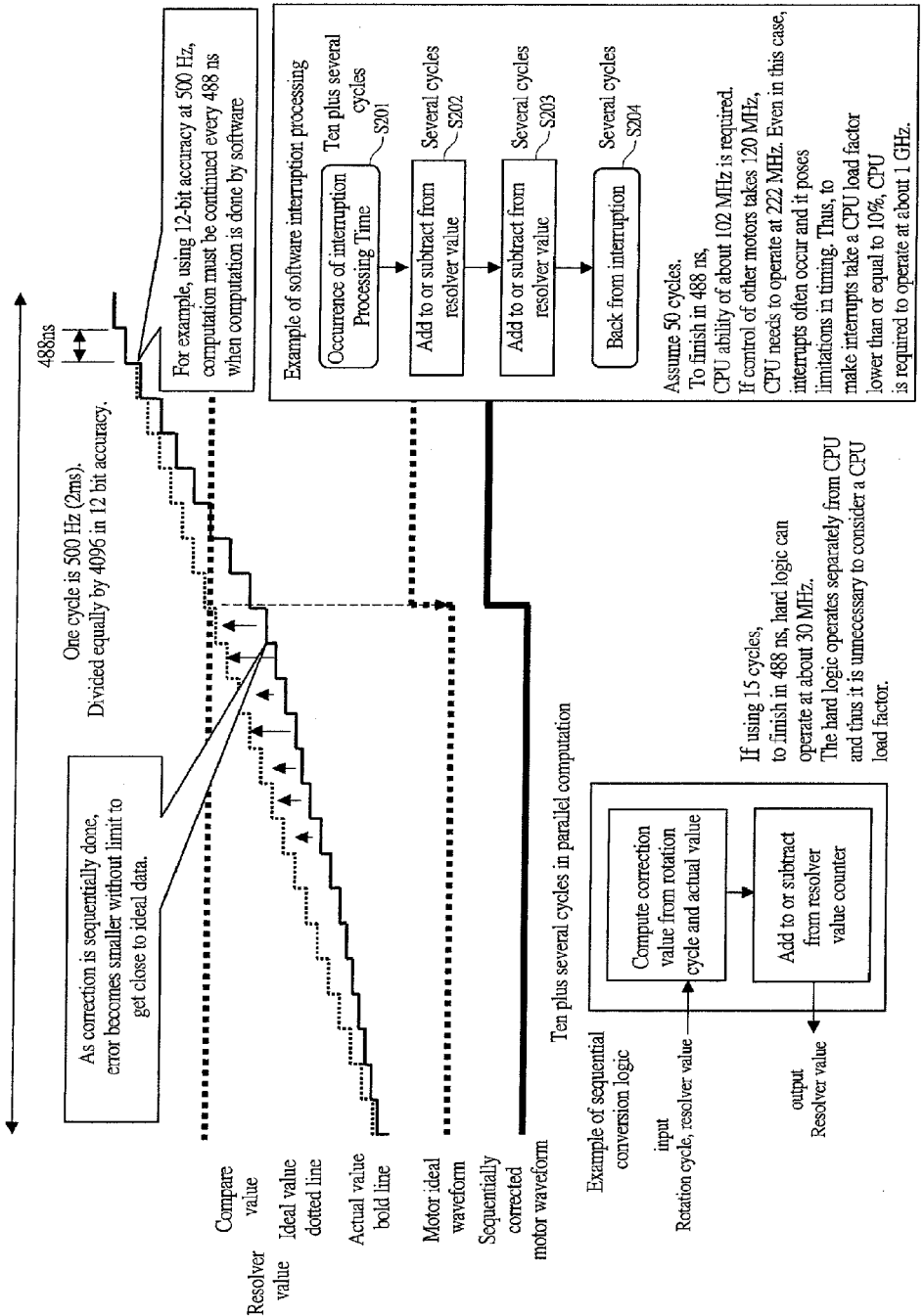
FIG. 9 is an explanatory diagram illustrating an operation summary of technology of correcting resolver value by the semiconductor integrated circuit device in FIG. 2.

FIG. 9 is an explanatory diagram illustrating an operation summary of the technique of correcting resolver value by the semiconductor integrated circuit device 1 of the present invention.

In the semiconductor integrated circuit device 1, the resolver value is sequentially corrected by the hardware processings performed by the computing circuit of resolver value correction 5. A sequential conversion logic of the computing circuit of resolver value correction 5 computes a correction value from a rotation cycle and the resolver value being inputted, and outputs a resolver value corrected by adding or subtracting the correction value to/from the resolver value. By the sequential correction, error is largely reduced, and the resolver value including error (illustrated by the solid line in FIG. 9) can be close to the ideal resolver value (illustrated by the dotted line in FIG. 9). Note that the motor ideal waveform and the sequentially-corrected motor waveform are output signals from the semiconductor integrated circuit device 1 such as the normal U phase (U) in FIG. 7.

When performing the same processings by software, as illustrated in the flowchart on the right side of FIG. 9, each of the processings of the steps takes ten plus several cycles, for example.

Assuming that 50 cycles are required for processings of steps S201 to S204, to finish these processings in 488 nm (500 Hz (2 ms) for one cycle with 12-bit accuracy), CPU processing performance of about 102 MHz is required.

For example, when 120 MHz is required for the other motor control, the CPU is required to operate at about 222 MHz. Also in this case, interrupt processings occur frequently and it results in a limitation of timing; therefore, if it is tried to make interruptions occupy 10% or less of CPU load, the CPU is required to work at an operation speed of about 1 GHz. The operation speed of the CPU is surely achievable in view of technology but it results in large power consumption. In addition, to consider as motor control in an automobile, there are a period in which the motor is in mid-speed to high-speed revolution and a period in which the motor is in a halting state to a low-speed revolution, and the CPU has an excessive processing performance in the period of halting state to low-speed revolution; therefore, there is wasted power consumption of the CPU.

On the contrary, when sequentially correcting error of the resolver value by software processings by the computing circuit of resolver value correction 5, assuming that the processing cycle is about 15 cycles, to finish the processings in 488 ns, a hardware logic to operate at only about 30 MHz is required. In addition, there is no need to consider the CPU load ratio as the computing circuit of resolver value correction 5 operates separately from the CPU 10.

Figure 10:
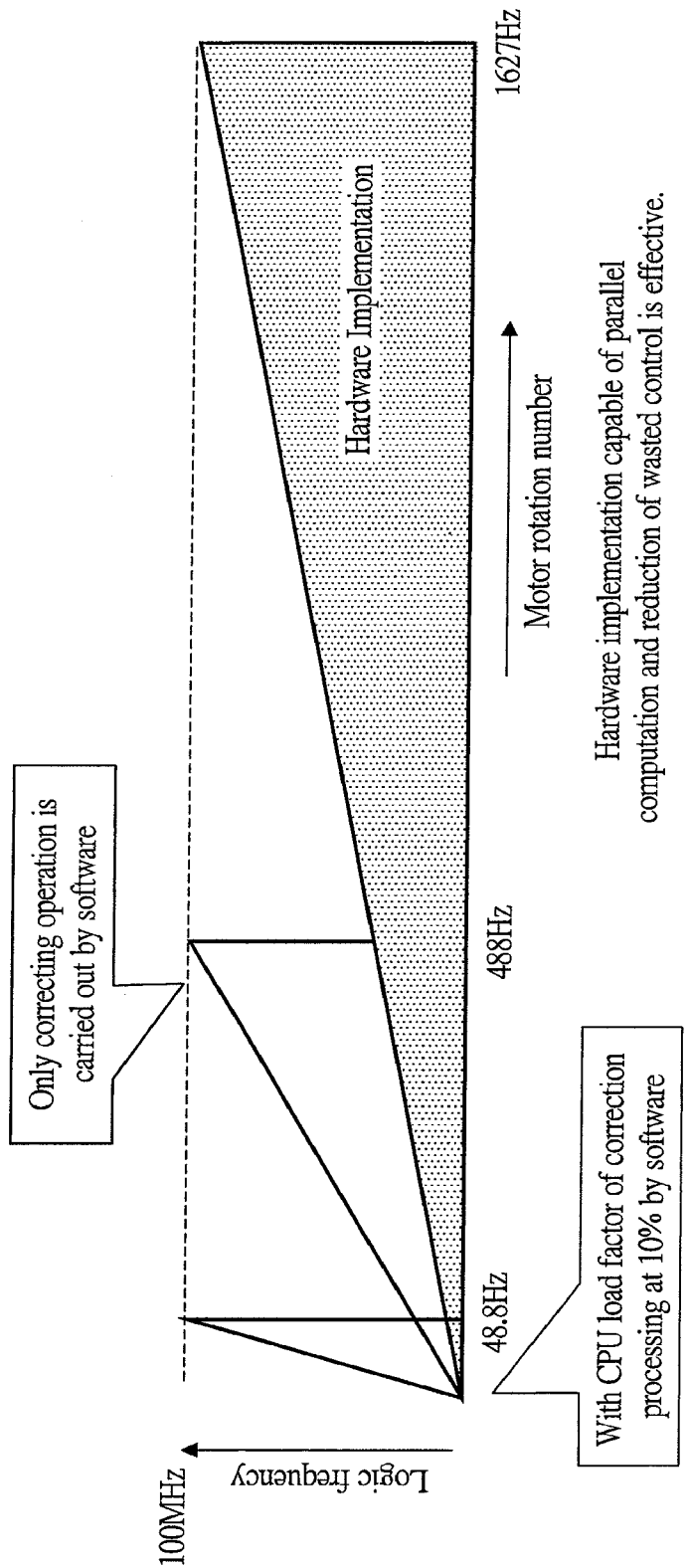
FIG. 10 is an explanatory diagram illustrating a difference in the maximum rotation number of a motor between a software correction processing and a hardware processing.

FIG. 10 is an explanatory diagram illustrating differences in a maximum rotation number of the motor in performing the correction processing by software and performing hardware processing by the computing circuit of resolver value correction 5 when the operation speed of the CPU is 100 MHz.

As illustrated, with CPU load ratio of about 10%, the motor rotation number is about 48.8 Hz (about 3000 rpm), and with CPU load ratio of 100% (when the correction processings are carried out by software), the motor rotation number is about 488 Hz (about 30000 rpm).

On the contrary, when the hardware processings by the computing circuit of resolver value correction 5 are performed, the motor revolution value can be largely increased to about 1627 Hz (about 98000 rpm).

Figure 11:
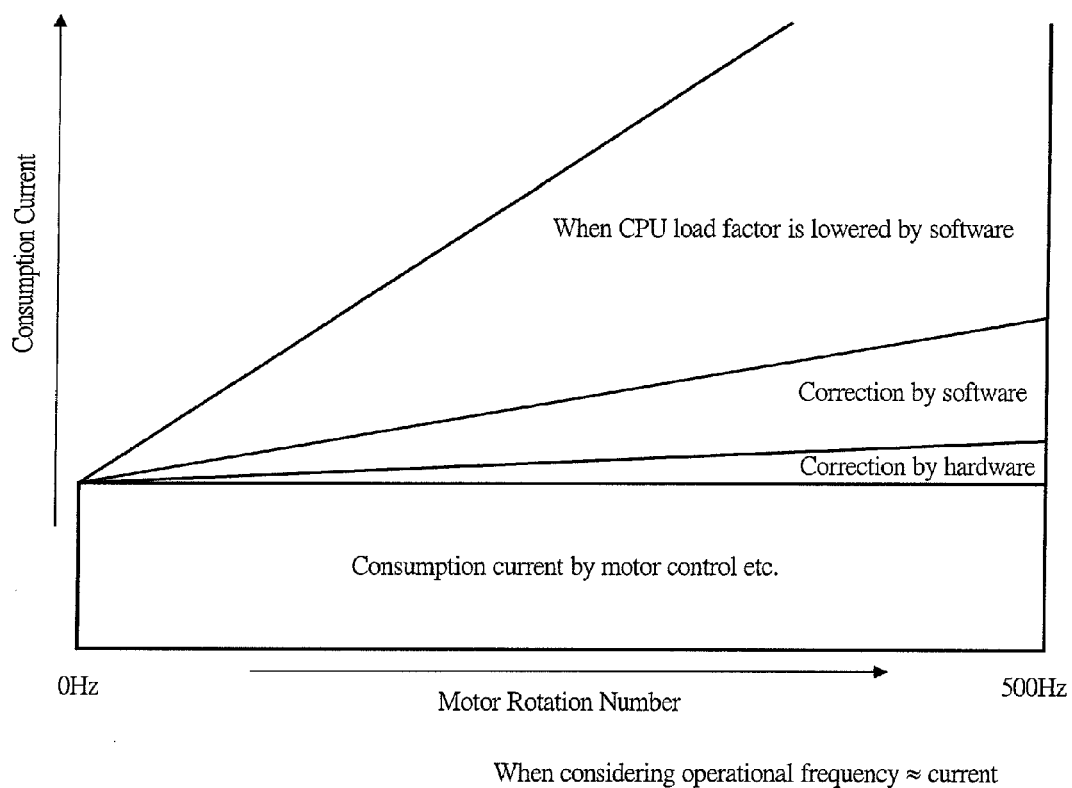
FIG. 11 is an explanatory diagram illustrating a comparative example of current consumption upon sequentially correcting a resolver value.

FIG. 11 is an explanatory diagram illustrating a comparative example of consumption current upon sequentially correcting the resolver value. It is considered here that the operation frequency current.

When the software processings are performed without lowering the CPU load ratio, as compared with the hardware processings by the computing circuit of resolver value correction 5, since the operation processings of the CPU are increased as the motor revolution value is increased; therefore, current consumption is large.

Further, to lower the CPU load ratio (about 10%) by the software processings, processing speed of the CPU should be increased to about 1 GHz as mentioned above, and it causes further larger current consumption.

Therefore, instead of controlling the motor by software control by the CPU from a halting state to a high speed of the motor speed, an operation frequency of the CPU is decided in consideration of power consumption in the semiconductor integrated circuit device 1, and the software control is performed in the motor rotation range of a halting state to a low speed so that the torque of the motor can be controlled depending on the situation, and, by performing control of switching control in accordance with respective processings by hardware in low-speed, mid-speed, and high-speed rotation ranges of the motor, it is possible to achieve proper power consumption in the semiconductor integrated circuit device 1.

In addition, in the computing circuit of resolver value correction 5, computing circuit of motor control 6, and motor waveform output circuit 7, a synchronization operation with clock at which the CPU etc. operate is not performed, but a data flow operation in accordance with inputs from the R/D converter 3 is performed instead, thereby achieving more reduction in power consumption.

Figure 12:
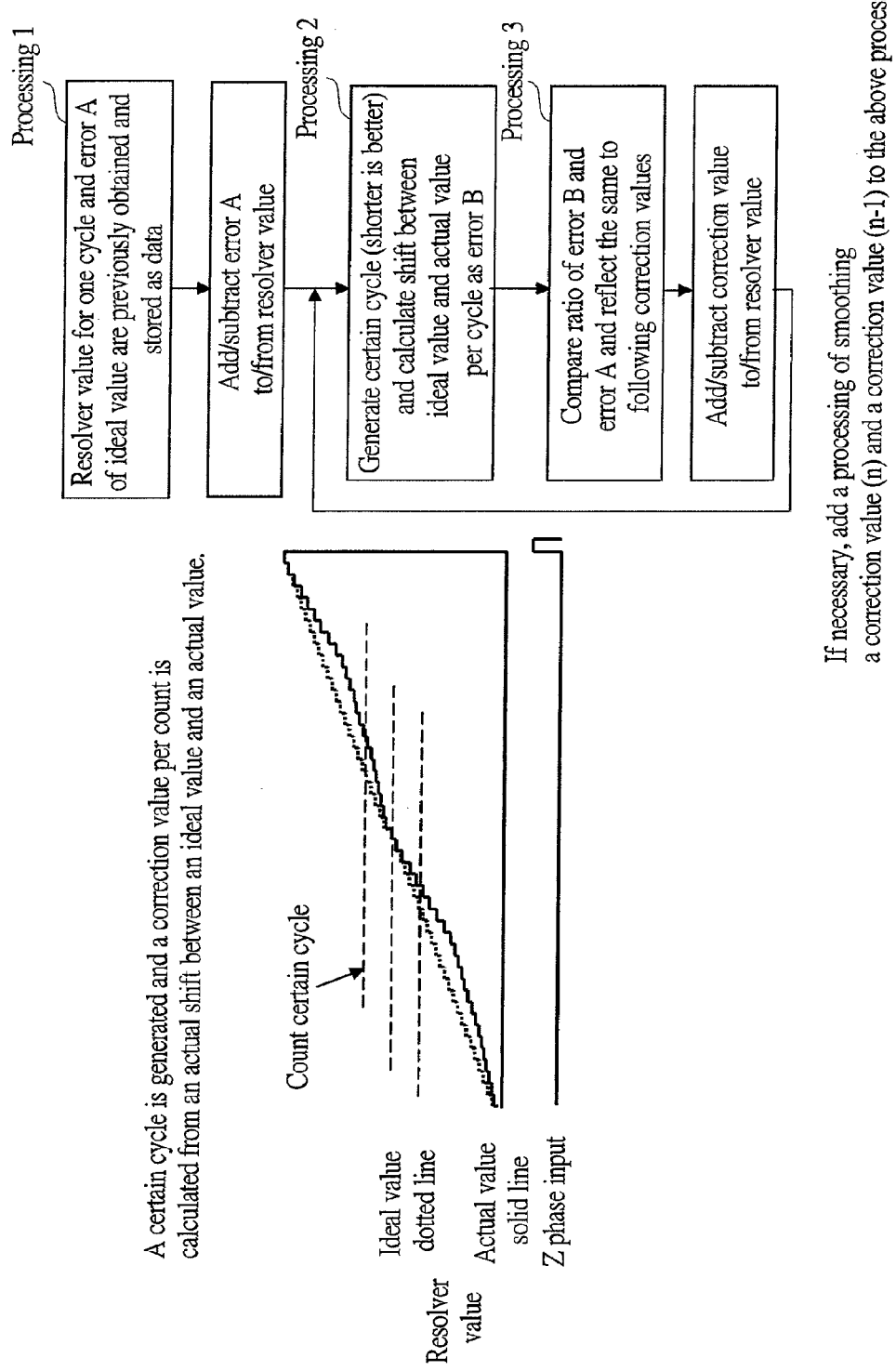
FIG. 12 is an explanatory diagram illustrating an example of technology of correcting resolver value by a computing circuit of resolver value correction provided in the semiconductor integrated circuit device in FIG. 2.

FIG. 12 is an explanatory diagram illustrating an example of technique of correcting the resolver value by the computing circuit of resolver value correction 5.

In this case, as illustrated, the computing circuit of resolver value correction 5 generates a certain cycle using a Z phase signal Z (Z phase input), a compare signal, a timer, etc. and calculates a correction value per count from an ideal resolver value (dotted line) and an actual resolver value (solid line).

First, error is obtained from an actual resolver value of one cycle in the resolver 2 and an ideal value that is obtained from an initial position of rotation of the motor and an elapsed time of rotation, and the error is taken as error A and stored (for example, in the memory portion 12, etc.) (processing 1). Error between an ideal value read from the memory portion 12 per optional certain cycle (shorter is better) and the resolver value is calculated as error B (processing 2). From a ratio of the error A and the error B, a correction value thereafter is calculated and reflected as a correction value to a resolver value thereafter (processing 3).

After reflecting, the step is back to the processing 2 and the correction is repeated sequentially. Also, if necessary, a processing of smoothing error C (n) and error C (n−1) is added to the processings 1 to 3.

Note that, the reading of the ideal value from the memory portion 12 may be reading the ideal value corresponding to a rotation position of the motor per an optional certain cycle or reading an ideal value of one cycle of the motor from the memory portion 12 to a memory such as a RAM, which is not illustrated, provided in the computing circuit of resolver value correction 5.

Figure 13:
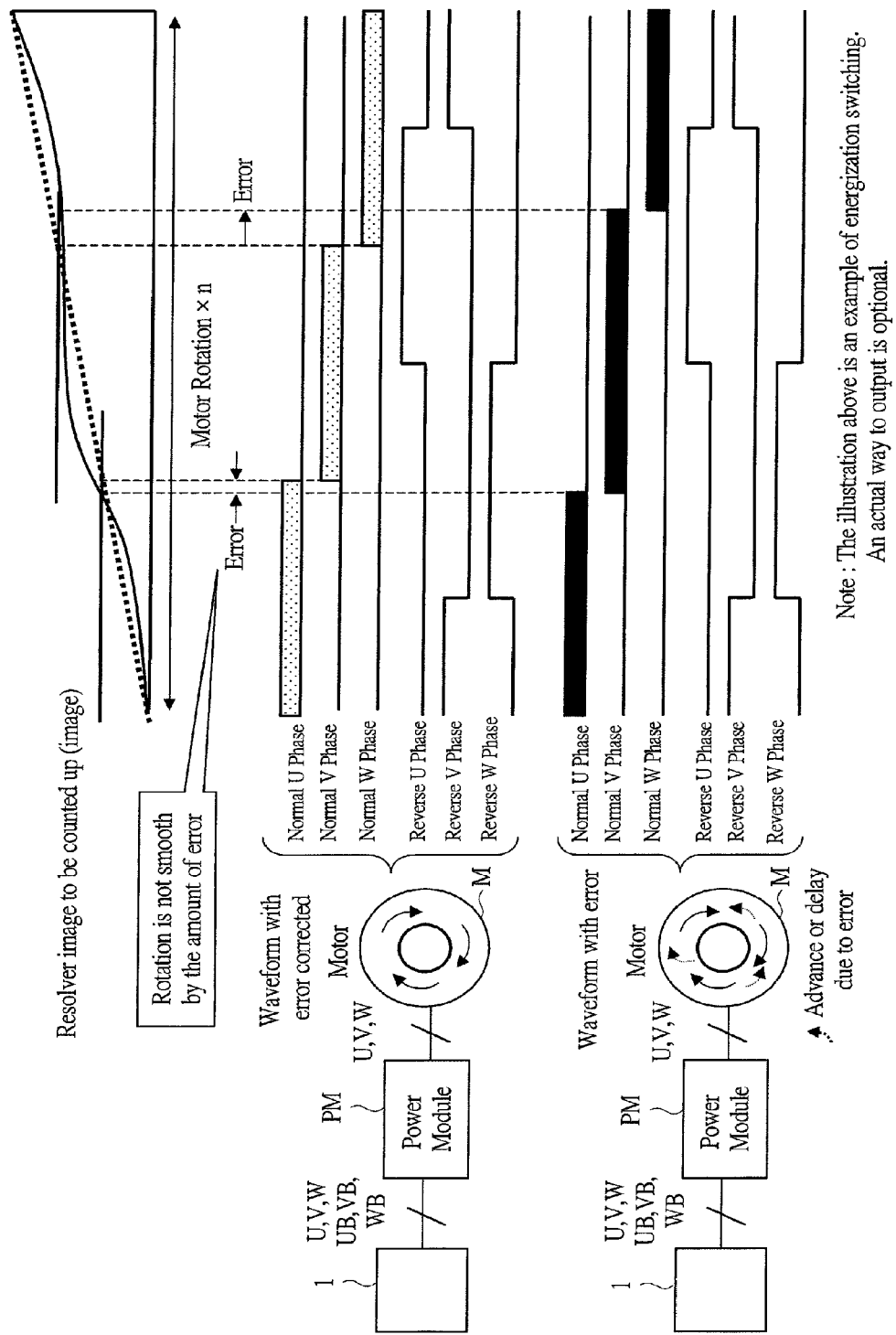
FIG. 13 is an explanatory diagram illustrating a comparative example upon switching energizing phase of a motor according to a compare match with a resolver value including error and a compare match with an error-corrected resolver value.

In this manner, through the correction, data storing, and reading by hardware processings of the resolver value by the computing circuit of resolver value correction 5, as illustrated on the upper side of FIG. 13, it is possible to generate a motor driving waveform at the most suitable timing.

Meanwhile, when error is included in the resolver value, as illustrated on the bottom side of FIG. 13, the timing of the motor driving waveform is messed up by only the error, making it impossible to achieve smooth rotation.

Note that, the normal U phase (U), normal V phase (V), normal W phase (W), reverse U phase (UB), reverse V phase (V), and reverse W phase (WE) are output signals from the semiconductor integrated circuit device 1 in the same manner as FIG. 7. These output signals control the U phase, V phase, and W phase of the motor M via the power module PM.

In this manner, according to the present embodiment, it is possible to have a timing of switching energization closer to an ideal one, and thus the rotation of the motor M can be efficient and at a higher revolution. Across a halting state (0 rpm) to a high-speed rotation (10000 rpm or more) of the motor, the driving of motor can be efficiently controlled.

Second Embodiment

A second embodiment will be described about differences from the first embodiment that functions from correction of resolver value to control of a motor M are divided by a plurality of CPUs, so that lower frequency and lower power consumption are achieved. Signal lines related to the control of the present embodiment are illustrated by dotted lines in the drawings.

Figure 14:
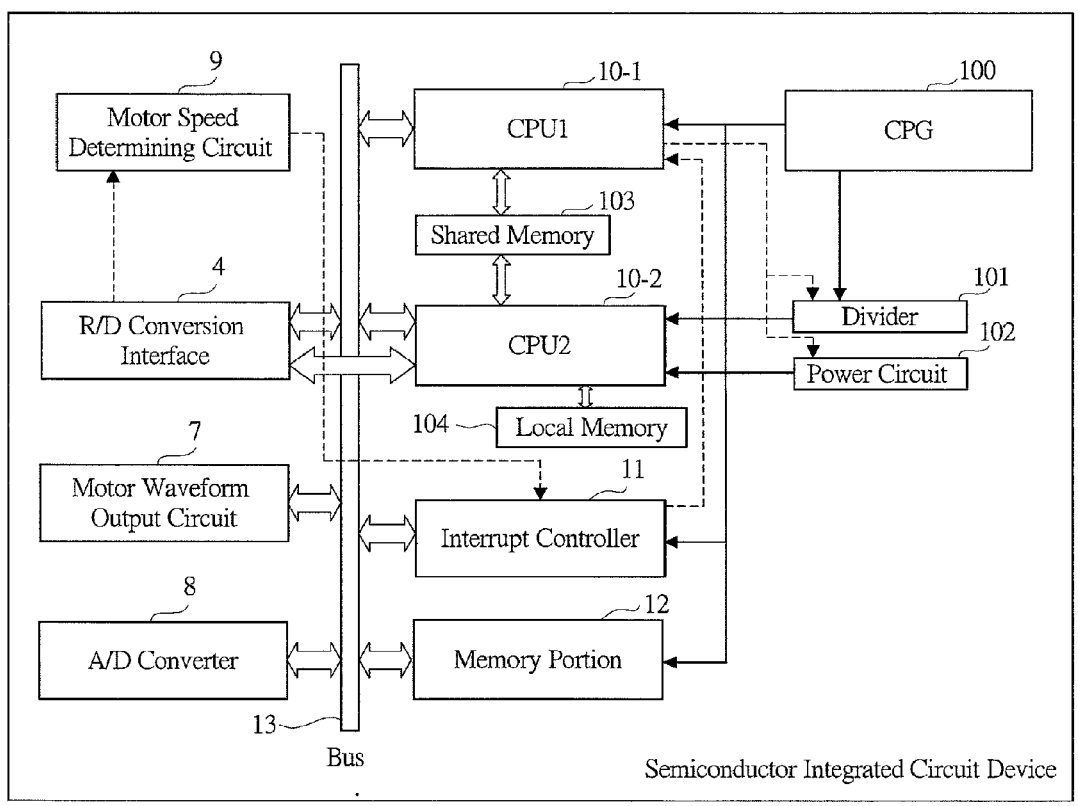
FIG. 14 is a block diagram illustrating a configuration example of a semiconductor integrated circuit device configuring a motor driving system used in electric vehicles and hybrid vehicles according to a second embodiment of the present invention.

A semiconductor integrated circuit device according to the second embodiment illustrated in FIG. 14 includes two CPUs of a first CPU and a second CPU (10-1, 10-2), a CPG 100 which generates clock to be supplied to a functional module of the semiconductor integrated circuit device such as CPU, a divider 101 which stops supply of the clock generated by the CPG and divides frequency, and a power circuit 102 which controls stop of power supply to a functional module in a halting state of operation.

Figure 15:
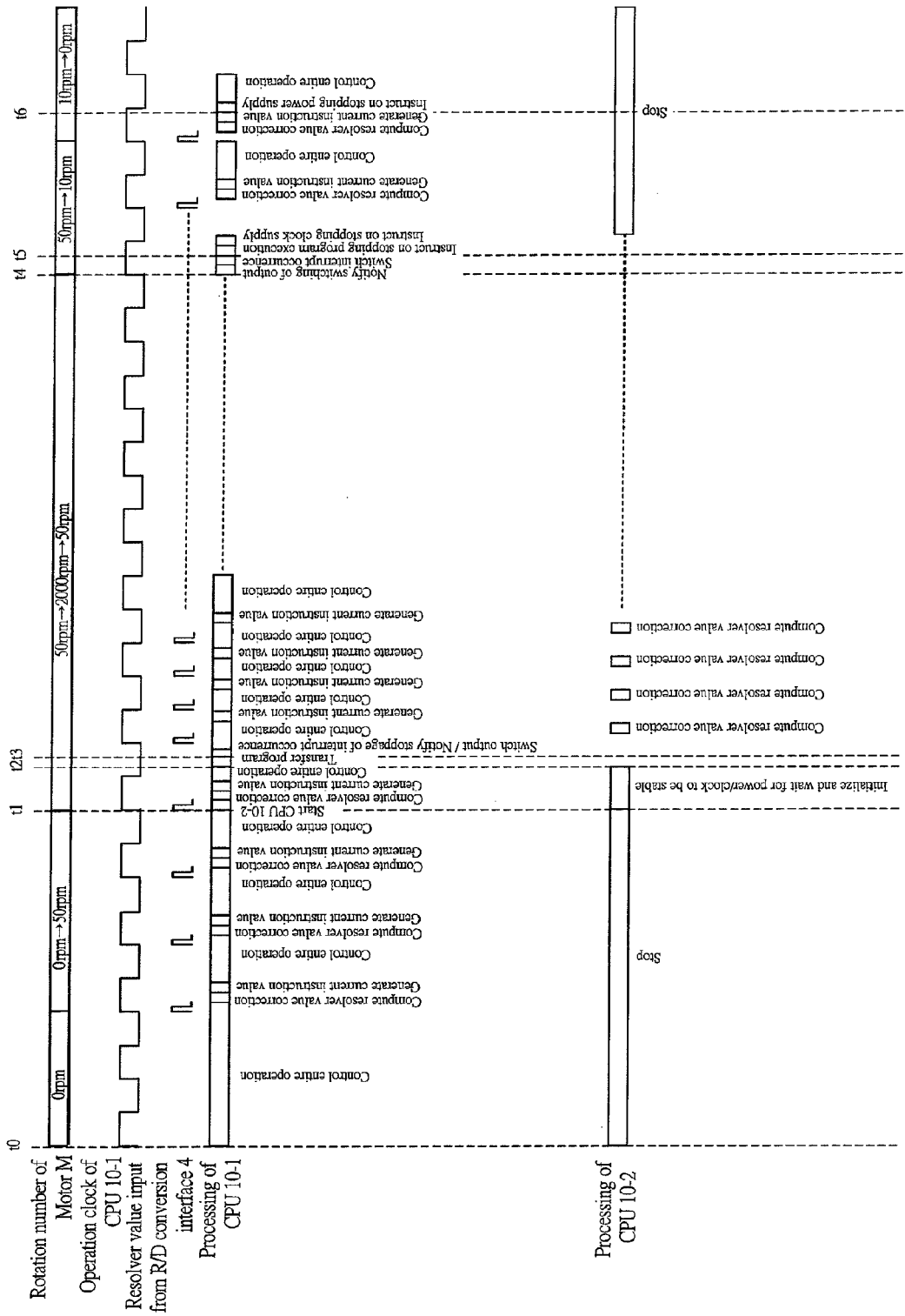
FIG. 15 is an explanatory diagram illustrating an example of operation timing in a CPU in the semiconductor integrated circuit device in FIG. 14.

Together with the timing of FIG. 15, operations of the semiconductor integrated circuit device in FIG. 14 will be described.

An output of an R/D converter 3 which converts an output value of a resolver 2 which detects rotation of a motor M of an electric vehicle etc. is inputted to an R/D conversion interface 4 and supplied to a motor speed determining circuit 9 as rotation speed information of the motor M by the R/D conversion interface 4; when the rotation speed of the motor M is from a halting state to a rotation speed lower than or equal to a first rotation speed (control switching rotation speed) (timing t0 to t1), the R/D conversion interface 4 notifies an interruption controller 11 of every signal input from the resolver, and the interruption controller 11 notifies the CPU 10-1 of generation of interrupt. The CPU 10-1 executes an interrupt processing program for generating motor control information per every interruption notification, performs a correction processing of the resolver value being converted to a digital value and control computing for controlling rotation of the motor M based on the corrected resolver value, and generates a current instruction value.

In accordance with the situation in which the rotation speed of the motor M is increased to be higher than the control switching speed, the motor speed determining circuit 9 notifies the interrupt controller 11 (timing t1). The interrupt controller 11 notifies the CPU 10-1 of generation of interrupt, and the CPU 10-1 instructs the divider 101 and the power circuit 102 to supply power and clock to the CPU 10-2. After a stand-by for a predetermined time until the power and clock supplied to the CPU 10-2 become stable, program for correcting the resolver value stored in the memory portion 12 is forwarded to a local memory 103 of the CPU 10-2 (timing t2). Here, frequency of the clock supplied to the CPU 10-2 may be the same as or lower than an operation frequency of the CPU 10-1 to suit to a frequency at which the resolver value from the RID conversion interface 4 is inputted and execution of program of resolver value correction.

The CPU 10-1 notifies the R/D conversion interface 4 of a notification not illustrated after the forwarding of the program of resolver value correction is finished, and the R/D conversion interface 4 stops output of the resolver value to a bus 13 and switches output so that the resolver value is directly outputted to the CPU 10-2 and further notifies the interrupt controller 11 of stop of interrupt generation in accordance with the output of the resolver value by the R/D conversion interface 11 (timing t3). The CPU 10-2 corrects the resolver value by fetching and executing the program of resolver value correction stored in the local memory 103 and stores the corrected resolver value to a shared memory 103 shared with the CPU 10-1 (timing t3 to t4).

While the motor M is rotating at a rotation speed higher than the control switching rotation speed (timing t3 to t4), the CPU 10-2 computes the correction processing in accordance with every input of resolver value from the R/D conversion interface 4, and outputs to the shared memory 103. The CPU 10-1 generates a current instruction value by executing the control computing program for controlling the rotation of the motor M based on the resolver value after correction stored in the shared memory 103 and executes the operation control program as a whole of the semiconductor integrated circuit device.

Storage of the resolver value after correction to the shared memory 103 by the CPU 10-2 may be done by setting a flag per storage by the CPU 10-2, and resetting the flag per read as the CPU 10-1 monitors the flag by polling, or generating an interrupt notification per storage of the resolver value after correction.

By forwarding program for correcting the resolver value to the local memory 103 and fetching the program from the local memory by the CPU 10-2, access competition to the bus 13 occurring as the CPU 10-2 fetches program to the memory portion 12 can be avoided.

As the speed of an electric vehicle is decelerated by a brake etc. and the rotation speed of the motor M becomes lower than the control switching rotation speed, in accordance with that, the motor speed determining circuit 9 notifies the interrupt controller 11 (timing t4). The interrupt controller 11 notifies the CPU 10-1 of interrupt generation. The CPU 10-1 notifies the R/D conversion interface of notification, which is not illustrated, in accordance with the interruption notification, and switches output of the resolver value so that the bus 13 outputs the resolver value, and switches so that interruption is generated per input of the resolver value together with switching. Next, the CPU 10-1 stops execution of program of resolver value correction to the CPU 10-2, and instruct the dividers 10-1 and 10-2 of stop of clock supply (timing t5).

While transistor leakage current during a halting period of the CPU 10-2 can be suppressed by stopping power supply to the CPU 10-2 and the local memory 103, if stop and start of power supply to the CPU 10-2 are repeated in a short time, the power consumption may be increased. Therefore, power supply may be stopped after waiting until the motor M is at a second rotation speed (power supply shutdown speed) that is lower than the control switching rotation speed (timing t6). Also, regarding the local memory 103, the power supply is stopped until the speed first reaches the control switching rotation speed, and, after the forwarding of the program of resolver value correction as the speed reaches the control switching rotation speed, power supply is controlled to be continued until, for example, engine stop (or power off) of the automobile, thereby also reducing power consumption for forwarding the program of resolver value correction.

Figure 16:
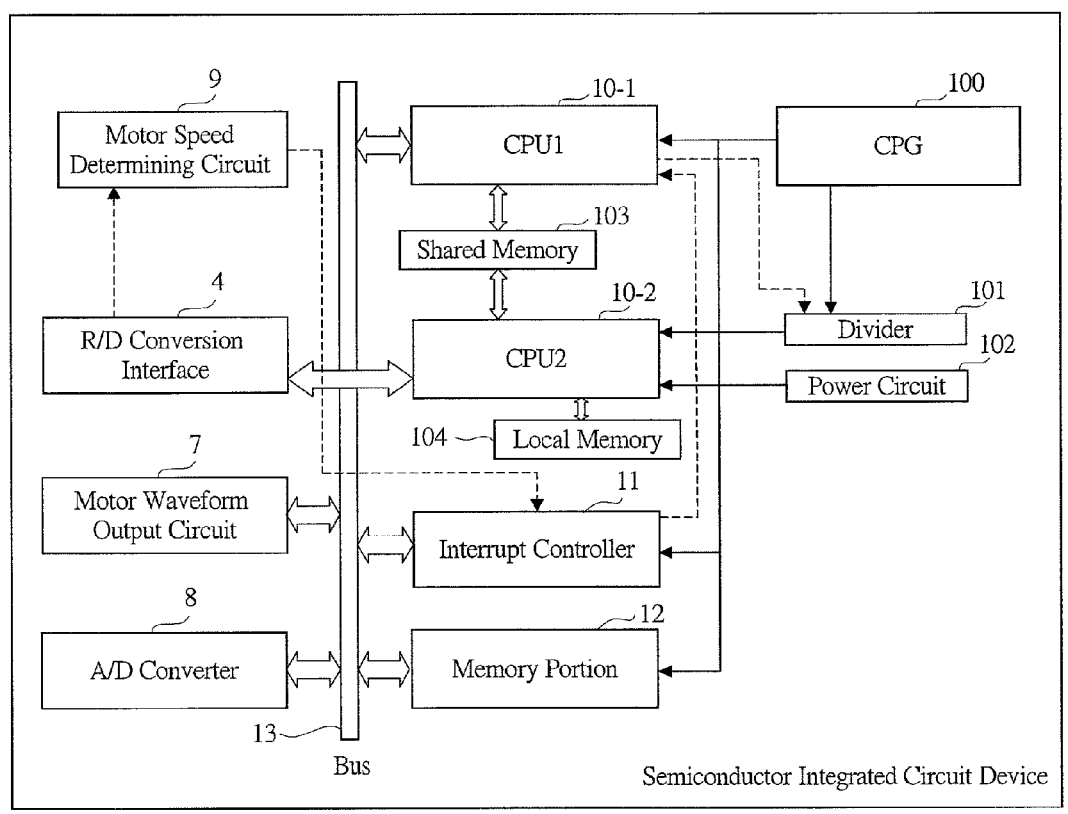
FIG. 16 is a block diagram illustrating a configuration example of a semiconductor integrated circuit device as another aspect of the second embodiment of the present invention.

In the configuration of the semiconductor integrated circuit device illustrated in FIG. 16, power and clock are always supplied to the CPU 10-2 during a period in which the semiconductor integrated circuit device is operating regardless of the rotation speed of the motor M.

Figure 17:
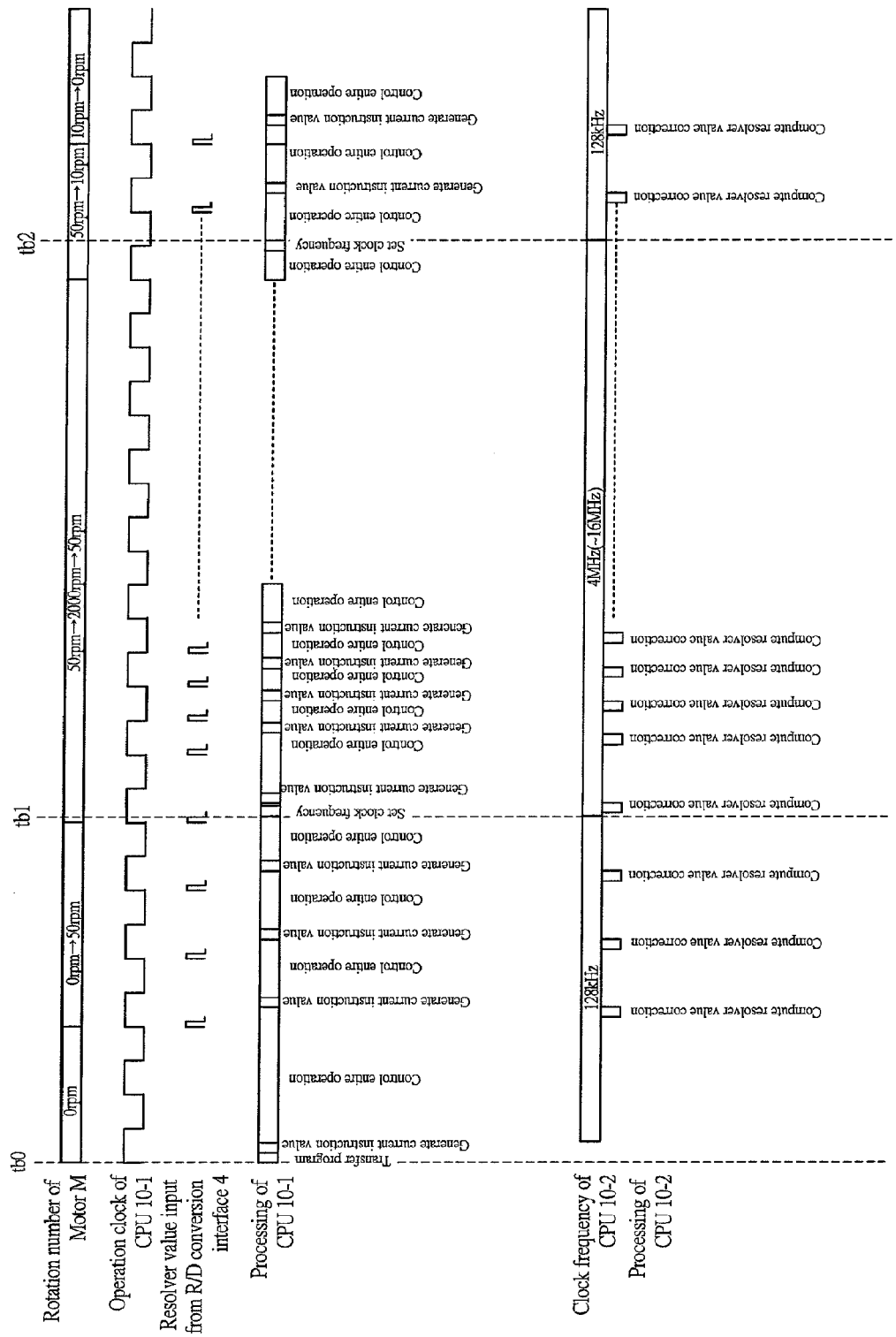
FIG. 17 is an explanatory diagram illustrating an example of operation timing in a CPU in the semiconductor integrated circuit device in FIG. 16.

Together with the timing in FIG. 17, differences in operations between the semiconductor integrated circuit device illustrated in FIG. 16 and the semiconductor integrated circuit device illustrated in FIG. 14 will be described.

In accordance with start of power supply and finish of initialization operation to the semiconductor integrated circuit device (timing tb0), the CPU 10-1 forwards the program of resolver value correction to be executed by the CPU 10-2 to the local memory 103 from the memory portion 12. Also, the CPU 10-1 sets frequency of the clock to be supplied to the CPU 10-2 in the divider 101 (128 kHz).

The R/D conversion interface 4 outputs the resolver value to the CPU 10-2, and the CPU 10-2 fetches the program of correcting resolver value from the local memory 103, and the resolver value after correction is stored in the shared memory 103.

In accordance with the output from the R/D conversion interface 4, determination of the rotation speed of the motor M is carried out by the motor speed determining circuit 9 and the interrupt controller 11 is notified in accordance with a detection that the rotation speed is reached to the first rotation speed (timing tb1), and the CPU 10-1 sets a change in the frequency of the clock supplied to the CPU 10-2 in the divider 101 in accordance with an interrupt notification from the interrupt controller 11 (128 kHz→4 MHz).

When an electric vehicle etc. is decelerated by a brake etc. in accordance with the rotation speed of the motor M detected by the motor speed determining circuit 9, the frequency of the clock to be supplied to the CPU 10-2 is lowered (timing tb2).

By changing the frequency of the clock to be supplied to the CPU 10-2 to be increased and decreased in a step-like manner in accordance with the rotation speed of the motor M in this manner, power consumption in the CPU 10-2 can be proper as the output from the R/D conversion interface 4 and the execution of the program of resolver value correction in the CPU 10-2 become appropriate.

Also in the second embodiment, the control described above in terms of paragraph number can be performed by the CPU 10-1.

In addition, although changing the frequency of the clock to be supplied while the CPU 10-2 is operating is not described in the description of the configuration of the semiconductor integrated circuit device illustrated in FIG. 14, it is needless to say that power consumption in the CPU 10-2 is made proper by performing control of increasing and decreasing the clock frequency in a step-like manner in accordance with the rotation speed of the motor M, in the same manner as the configuration of the semiconductor integrated circuit device illustrated in FIG. 16.

By using a CPU having the same architecture as the CPU 10-1 and the CPU 10-2, it becomes possible to use the same program for the program of resolver value correction, and it becomes possible to lower the development cost of the program by lowering an occupation rate of the program in the memory portion 12. Meanwhile, even when the CPU 10-2 is a CPU having a different architecture and a dedicated program is stored in the memory 12, there is no more problem arising than an increase in an occupation rate of the program in the memory portion 12 and an increase in the program development cost; thus, for example, if program of resolver value correction already exists in a CPU of another architecture, it is possible to reuse the program.

In the foregoing, the invention made by the inventor of the present invention has been concretely described based on the embodiments. However, it is needless to say that the present invention is not limited to the foregoing embodiments and various modifications and alterations can be made within the scope of the present invention.

For example, while control techniques of motors used in electric vehicles etc. have been described in the embodiments in the foregoing, the present invention can be used in control techniques of not only motors of electric vehicles but also motors in general which require high revolution.

The invention claimed is:

1. A semiconductor integrated circuit device, comprising:
a Central Processing Unit (CPU) executing software;
a motor speed determining circuit for determining whether a rotation speed of a drive motor provided in an automobile is lower than or higher than a predetermined value;
a computing portion for computing a resolver value correction; and
a motor control portion for generating a motor driving waveform for driving the drive motor,
wherein the semiconductor integrated circuit device is capable of switching generating the motor driving waveform by a software processing by the CPU or generating the motor driving waveform by a hardware processing by the motor control portion, in accordance with the rotation speed of the drive motor,
wherein the semiconductor integrated circuit device controls increasing and decreasing a rotation torque of the drive motor, by controlling a frequency of the motor driving waveform for driving the drive motor and an amount of drive current in accordance with a rotation resistance of the motor by the software processing by the CPU, in a period in which the drive motor is in a halting state or a period in which the rotation speed of the drive motor is relatively low, when the rotation speed of the drive motor is lower than the predetermined value,
wherein the semiconductor integrated circuit device performs control of outputting the motor driving waveform in accordance with a rotation angle of the drive motor by the hardware processing by the motor control portion, in a period in which the rotation speed of the drive motor is relatively high, when the rotation speed of the drive motor is higher than the predetermined value, and
wherein the semiconductor integrated circuit device sequentially corrects a resolver value including error made by counting up a digital signal based on a resolver signal outputted from a resolver attached to the drive motor by a hardware processing by the computing portion of resolver value correction.

2. The semiconductor integrated circuit device according to claim 1, wherein the semiconductor integrated circuit device performs control of increasing the rotation torque of the drive motor by performing control of reducing the frequency of the motor driving waveform and increasing the amount of drive current in accordance with increased rotation resistance of the drive motor in the software processing.

3. The semiconductor integrated circuit device according to claim 1, wherein the computing portion of resolver value correction has a hardware configuration performing a data flow operation in which computing is performed in accordance with input of the resolver signal outputted from the resolver.

4. The semiconductor integrated circuit device according to claim 1, wherein the motor control portion calculates positional data of the drive motor from the resolver value corrected by the computing portion of resolver value correction, computes a current instruction value from the positional data, a value of motor current flowing in the drive motor, and a motor current instruction value, and generates a motor driving waveform from the current instruction value.

5. The semiconductor integrated circuit device according to claim 1, wherein the motor speed determining circuit performs control of switching of a waveform of the motor driving waveform in accordance with the rotation speed of the drive motor.

6. The semiconductor integrated circuit device according to claim 1, wherein the hardware processing, in accordance with a deceleration operation instruction of the automobile, can be performed to control output of a drive signal giving a rotation torque in a reverse direction to a rotation direction of the drive motor in accordance with the rotation angle of the drive motor.

7. An automobile, comprising:
a plurality of tires;
a motor for driving the tires;
a resolver; and
a semiconductor integrated circuit device, including:
a CPU executing software,
a motor speed determining circuit for determining whether a rotation speed of the motor is lower than or higher than a predetermined value,
a computing portion for computing a resolver value correction, and a motor control portion for generating a motor driving waveform for driving the motor,
wherein the semiconductor integrated circuit device is capable of switching generating the motor driving waveform by a software processing by the CPU or generating the motor driving waveform by a hardware processing by the motor control portion, in accordance with the rotation speed of the motor,
wherein the semiconductor integrated circuit device controls increasing and decreasing a rotation torque of the motor by controlling a frequency of the motor driving waveform for driving the motor and an amount of drive current, in accordance with rotation resistance of the motor by the software processing by the CPU, in a period in which the motor is in a halting state or a period in which the rotation speed of the drive motor is relatively low, when the rotation speed of the motor is lower than the predetermined value,
wherein the semiconductor integrated circuit device performs control of outputting the motor driving waveform in accordance with a rotation angle of the motor by the hardware processing by the motor control portion, in a period in which the rotation speed of the motor is relatively high, when the rotation speed of the motor is higher than the predetermined value, and
wherein the semiconductor integrated circuit device sequentially corrects a resolver value including error made by counting up a digital signal based on a resolver signal outputted from the resolver attached to the motor, by a hardware processing by the computing portion of resolver value correction.

8. The automobile according to claim 7, wherein the semiconductor integrated circuit device performs control of increasing the rotation torque of the motor by performing control of reducing the frequency of the motor driving waveform and increasing the amount of drive current in accordance with increased rotation resistance of the motor in the software processing.

9. The automobile according to claim 7, wherein the computing portion of resolver value correction of the semiconductor integrated circuit device has a hardware configuration performing a data flow operation in which computing is performed in accordance with input of the resolver signal outputted from the resolver.

10. The automobile according to claim 7, wherein the motor control portion of the semiconductor integrated circuit device calculates positional data of the motor from the resolver value corrected by the computing portion of resolver value correction, computes a current instruction value from the positional data, a value of motor current flowing in the motor, and a motor current instruction value, and generates a motor driving waveform from the current instruction value.

11. The automobile according to claim 7, wherein the motor speed determining circuit performs control of switching of a waveform of the motor driving waveform in accordance with the rotation speed of the motor.

12. The automobile according to claim 7, wherein the hardware processing, in accordance with a deceleration operation instruction of the automobile, can be performed to control output of a drive signal giving a rotation torque in a reverse direction to a rotation direction of the motor in accordance with the rotation angle of the motor.

13. A motor driving device for a motor that drives tires in an automobile, the motor driving device comprising:
an Analog/Digital (A/D) converter for converting, to a digital signal, a resolver signal outputted from a resolver attached to the motor; and
a semiconductor integrated circuit device, including:
a CPU executing software,
a motor speed determining circuit for determining whether a rotation speed of the motor is lower than or higher than a predetermined value,
a computing portion for computing a resolver value correction, and
a motor control portion for generating a motor driving waveform for driving the motor,
wherein the semiconductor integrated circuit device is capable of switching generating the motor driving waveform by a software processing by the CPU or generating the motor driving waveform by a hardware processing by the motor control portion, in accordance with the rotation speed of the motor,
wherein the semiconductor integrated circuit device controls increasing and decreasing a rotation torque of the motor, by controlling a frequency of the motor driving waveform for driving the motor and an amount of drive current in accordance with rotation resistance of the motor by the software processing by the CPU, in a period in which the motor is in a halting state or a period in which the rotation speed of the drive motor is relatively low, when the rotation speed of the motor is lower than the predetermined value,
wherein the semiconductor integrated circuit device performs control of outputting the motor driving waveform in accordance with a rotation angle of the motor by the hardware processing by the motor control portion, in a period in which the rotation speed of the motor is relatively high, when the rotation speed of the motor is higher than the predetermined value, and
wherein the semiconductor integrated circuit device sequentially corrects a resolver value including error made by counting up the digital signal outputted from the R/D converter by a hardware processing by the computing portion of resolver value correction.

14. The motor driving device according to claim 13, wherein the semiconductor integrated circuit device performs control of increasing the rotation torque of the motor by performing control of reducing the frequency of the motor driving waveform and increasing the amount of drive current in accordance with increased rotation resistance of the motor in the software processing.

15. The motor driving device according to claim 13, wherein the computing portion of resolver value correction of the semiconductor integrated circuit device has a hardware configuration performing a data flow operation in which computing is performed in accordance with input of the resolver signal outputted from the resolver.

16. The motor driving device according to claim 13, wherein the motor control portion of the semiconductor integrated circuit device calculates positional data of the motor from the resolver value corrected by the computing portion of resolver value correction, computes a current instruction value from the positional data, a value of motor current flowing in the motor, and a motor current instruction value, and generates a motor driving waveform from the current instruction value.

17. The motor driving device according to claim 13, wherein the motor speed determining circuit performs control of switching of a waveform of the motor driving waveform in accordance with the rotation speed of the motor.

18. The motor driving device according to claim 13, wherein the hardware processing, in accordance with a deceleration operation instruction of the automobile, can be performed to control output of a drive signal giving a rotation torque in a reverse direction to a rotation direction of the motor in accordance with the rotation angle of the motor.

19. A motor driving device for a motor that drives tires in an automobile, the motor driving device including a semiconductor integrated circuit device comprising:
- an A/D converter for converting, to a digital signal, a resolver signal outputted from a resolver attached to the motor;
- a CPU executing software;
- a motor speed determining circuit for determining whether a rotation speed of the motor is lower than or higher than a predetermined value;
- a computing portion for computing a resolver value correction; and
- a motor control portion for generating a motor driving waveform for driving the motor,
- wherein the semiconductor integrated circuit device is capable of switching generating the motor driving waveform by a software processing by the CPU or generating the motor driving waveform by a hardware processing by the motor control portion, in accordance with the rotation speed of the motor,
- wherein the semiconductor integrated circuit device controls increasing and decreasing a rotation torque of the motor, by controlling a frequency of the motor driving waveform for driving the motor and an amount of drive current in accordance with rotation resistance of the motor by the software processing by the CPU, in a period in which the motor is in a halting state or a period in which the rotation speed of the drive motor is relatively low, when the rotation speed of the motor is lower than the predetermined value,
- wherein the semiconductor integrated circuit device performs control of outputting the motor driving waveform in accordance with a rotation angle of the motor by the hardware processing by the motor control portion, in a period in which the rotation speed of the motor is relatively high, when the rotation speed of the motor is higher than the predetermined value, and
- wherein the semiconductor integrated circuit device sequentially corrects a resolver value including error made by counting up the digital signal outputted from the R/D converter by a hardware processing by the computing portion of resolver value correction.

20. The motor driving device according to claim 19, wherein the semiconductor integrated circuit device performs control of increasing the rotation torque of the motor by performing control of reducing the frequency of the motor driving waveform and increasing the amount of drive current in accordance with increased rotation resistance of the motor in the software processing.

21. The motor driving device according to claim 19, wherein the computing portion of resolver value correction of the semiconductor integrated circuit device has a hardware configuration performing a data flow operation in which computing is performed in accordance with input of the resolver signal outputted from the resolver.

22. The motor driving device according to claim 19, wherein the motor control portion of the semiconductor integrated circuit device calculates positional data of the motor from the resolver value corrected by the computing portion of resolver value correction, computes a current instruction value from the positional data, a value of motor current flowing in the motor, and a motor current instruction value, and generates a motor driving waveform from the current instruction value.

23. The motor driving device according to claim 19, wherein the motor speed determining circuit performs control of switching of a waveform of the motor driving waveform in accordance with the rotation speed of the motor.

24. The motor driving device according to claim 19, wherein the hardware processing, in accordance with a deceleration operation instruction of the automobile, can be performed to control output of a drive signal giving a rotation torque in a reverse direction to a rotation direction of the motor in accordance with the rotation angle of the motor.

* * * * *